United States Patent
Scantlebury et al.

(10) Patent No.: US 9,587,479 B2
(45) Date of Patent: Mar. 7, 2017

(54) VELOCITY SENSOR FOR A PLUNGER LIFT SYSTEM

(71) Applicant: Extreme Telematics Corp., Calgary (CA)

(72) Inventors: Mark David Scantlebury, Calgary (CA); Timothy Daly, Calgary (CA); James La Haye, Calgary (CA); Valens D'Silva, Calgary (CA)

(73) Assignee: Extreme Telematics Corp, Calgary (CA)

( * ) Notice: Subject to any disclaimer, the term of this patent is extended or adjusted under 35 U.S.C. 154(b) by 492 days.

(21) Appl. No.: 14/181,218

(22) Filed: Feb. 14, 2014

(65) Prior Publication Data

US 2014/0231079 A1 Aug. 21, 2014

(51) Int. Cl.
```
G01P 3/66      (2006.01)
E21B 47/00     (2012.01)
E21B 43/12     (2006.01)
F04B 47/12     (2006.01)
```

(52) U.S. Cl.
CPC .............. *E21B 47/00* (2013.01); *F04B 47/12* (2013.01); *G01P 3/66* (2013.01); *E21B 43/121* (2013.01)

(58) Field of Classification Search
CPC combination set(s) only.
See application file for complete search history.

(56) References Cited

U.S. PATENT DOCUMENTS

| | | | |
|---|---|---|---|
| 4,291,761 A | | 9/1981 | Watson |
| 4,955,279 A | * | 9/1990 | Nahrwold .................. 89/6.5 |
| 5,146,991 A | | 9/1992 | Rogers, Jr. |
| 5,825,177 A | * | 10/1998 | Finnestad et al. ............ 324/179 |
| 5,878,817 A | | 3/1999 | Stastka |
| 6,536,522 B2 | | 3/2003 | Birckhead et al. |
| 6,595,287 B2 | | 7/2003 | Fisher |
| 6,883,606 B2 | | 4/2005 | Evans et al. |
| 7,202,658 B2 | * | 4/2007 | Ketelaars et al. ....... 324/207.24 |
| 7,219,725 B2 | | 5/2007 | Chisholm |
| 7,490,675 B2 | | 2/2009 | Hearn |
| 7,597,143 B2 | | 10/2009 | Giacomino |
| 7,690,425 B2 | | 4/2010 | Giacomino |
| 7,748,450 B2 | | 7/2010 | Mundell |
| 7,806,188 B2 | | 10/2010 | Hearn |
| 7,819,189 B1 | | 10/2010 | Cosby |
| 7,950,464 B2 | | 5/2011 | Atencio et al. |
| 7,963,326 B2 | | 6/2011 | Giacomino |

(Continued)

FOREIGN PATENT DOCUMENTS

DE 10 2013 018003 * 6/2014 ............... G01P 3/66
JP 2003099886 A 4/2003

*Primary Examiner* — Huan Tran
(74) *Attorney, Agent, or Firm* — Craig J. Lervick; Larkin Hoffman Daly & Lindgren Ltd.

(57) ABSTRACT

A velocity sensor, a controller, a plunger lift system and method for controlling a plunger lift system is provided. The velocity sensor can use a first magnetic field sensor and a second magnetic field sensor spaced a sensor distance to determine a velocity of a plunger as it passes the velocity sensor. The controller can use information received from the velocity sensor to both control the operation of the plunger lift system using the measured plunger velocity obtained from the velocity sensor and shut down the well if the plunger is measured travelling too fast.

33 Claims, 11 Drawing Sheets

(56) References Cited

U.S. PATENT DOCUMENTS

| | | | |
|---|---|---|---|
| 8,800,359 B2 * | 8/2014 | Furch et al. | 73/167 |
| 2010/0310384 A1 | 12/2010 | Stephenson et al. | |
| 2012/0323493 A1 | 12/2012 | Wright et al. | |
| 2015/0136389 A1 * | 5/2015 | Bergman | 166/250.15 |

* cited by examiner

VELOCITY SENSOR FOR A PLUNGER LIFT SYSTEM

The invention relates to the control of an oil and gas well using a plunger lift device and more particularly to a velocity sensor to determine the velocity of the plunger at the top of the well and methods utilizing this velocity determination.

BACKGROUND

A plunger lift is an artificial lift method that is used to remove fluids from a gas well. A plunger lift system uses a freely moving plunger in the production tubing. A seal is formed between the plunger and the production tubing that prevents fluid from passing between the plunger and the wall of the production tubing. The plunger is allowed to sit at the bottom of the well until sufficient pressure builds up behind the plunger and then the plunger is allowed to rise to the top of the well. Fluid that has accumulated on top of the plunger is carried up the well by the plunger to the well head, where this fluid is then removed from the well.

The movement of the plunger is controlled by opening and closing a valve between the production tubing and an outlet line (commonly called a sales line). When the valve is closed, the plunger drops to the bottom of the well. With the valve closed, the pressure from the well builds up and when a desired pressure level is reached, the valve can be opened, connecting the production tubing with the outlet line. Because the outline line is typically at a lower pressure than the elevated pressure in the production tubing, the gas in the production tubing flows out of the well through the open valve and into the outlet line. This causes the plunger to rise in the well. When the plunger rises into the well head, it can then be held in the well head until the gas exiting the production well through the open valve is sufficiently reduced and the plunger can then fall back down the production tubing.

The time the plunger is held in the well head and the valve is left open is called the "afterflow" time. This afterflow time is the time that gas is being produced from the well by allowing it to leave the well and enter the outlet line. However, having too large of an afterflow time can cause too much water to enter the well casing causing the well to "water in". This can occur when the buildup of water in the well causes a hydrostatic barrier preventing gas from the formation from exiting the well. Over time, as more and more water is removed from the well casing by the plunger, the afterflow time may be able to be lengthened.

Typically, electronic controllers are used to control the operation of the plunger lift system. The electronic controller is used to control the opening and closing of the valve based on an afterflow time and a close time. Typically, these plunger lift systems will have a plunger arrival sensor positioned near the top of the well (usually in a plunger receiver in the well head) that can sense when the plunger has reached the top of the well.

In these systems, the controller can typically determine an average velocity of the plunger during its trip up the well. It can do this by determining the time when the valve was first opened, causing the plunger to begin to rise, and the time the plunger arrival sensor determines that the plunger has reached the top of the well. With this trip time and the depth of the well, the controller can calculate an average velocity that the plunger was travelling during its trip to the top of the well.

However, this calculated average velocity is just that; an average velocity of the plunger over the entire trip up the well. It does not take into account the fact that the plunger may travel at different speeds as it travels up the well. For example, the plunger could be traveling much slower at the bottom of the well because it is just starting to move and will pick up speed as it continues to rise up the well. Additionally, the plunger may be picking up speed throughout its entire trip up the well and may be travelling faster at the top of the well than the average velocity. This acceleration of the plunger could be due to a number of factors, such as the loss of fluid from above the plunger, decompressing of the gas, a hole in the tubing, fluids unloading above the plunger down the sales line, etc. The use of an average velocity of the plunger during its trip up the well does not allow the controller to know how fast the plunger is moving at the top of the well.

Not knowing the velocity of the plunger can create a number of problems. First, if the plunger is moving too fast when it enters the well head it can damage the well head. Typically, the plunger receiver that stops the plunger when it reaches the well head contains a spring, rubber damper, etc. that the plunger can impact against when it reaches the plunger receiver in order to stop the plunger. However, if the plunger is travelling too fast when it reaches the top of the well and enters the plunger receiver, it can hit the top of the plunger receiver too hard and damage the plunger receiver and the well head. The speed the well head can handle will depend on the well head and the weight of the plunger. Currently, when the average velocity of the plunger is used, it cannot be accurately determined what the velocity of the plunger is when it reaches the plunger receiver. It could be travelling slower than the average velocity, or conversely, it could be traveling faster than the average velocity.

The controller typically uses a threshold velocity as a warning that the plunger is travelling too fast and can damage the well head. If the average velocity approaches or surpasses the threshold velocity, the controller knows that damage to the well head may occur and can act accordingly (such as shutting down the plunger lift system). However, because the average velocity is not a clear indicator of the velocity of the plunger as it reaches the top of the well, typically the controllers use a threshold velocity that is lower than what they could use to take into account the fact that the average velocity determined by the controller during a trip up the well by the plunger may be lower than the speed of the plunger at the top of the well. This can cause the velocity of the plunger to be set by the controller to a lower value than may be ideal to try and ensure that the plunger is not traveling too fast at the top of the well. Alternatively, if the plunger is slowing near the top of the well because of the pressure of the well above the plunger, the speed of the plunger at the top of the well may be lower than the average velocity. With the controller using a lower threshold for the velocity than is required, this could mean the plunger could be allowed to travel faster than the threshold value because the plunger is actually slowing near the top of the well.

The use of the average velocity of the plunger on its trip up the well can also cause inefficiencies when the average velocity or trip time is being used to try and optimize the operation of the plunger lift system. Typically, the theory behind the operation of a plunger lift system is to try and have the plunger rising at a velocity that is not too slow to cause water and/or other fluids being carried above the plunger to fall off the top of the plunger, but not rising so fast that it breaks components and causes damage to the well head when it reaches the top of the well. However, because an average velocity is typically used by a controller of the plunger lift system to control the operation of the plunger lift system, to account for the fact that the velocity could be higher than the average velocity when the plunger reaches the top of the well, the average velocity that these systems try to have the plunger rise at is typically lower than it could ideally be. By using the average velocity, these systems tend to be a bit less efficient than they could be because they tend to build in a margin to account for the fact that the average velocity of the plunger is being used rather than a velocity of the plunger at the top of the well.

SUMMARY

In a first aspect, a velocity sensor for sensing the velocity of a plunger arriving at a top of a well is provided. The velocity sensor comprises: a circuit board; a processing unit; a first magnetic field sensor; a second magnetic field sensor spaced a sensor distance from the first magnetic field sensor on the circuit board; and at least one memory containing program instructions. The processing unit is responsive to the program instructions and operative to: obtain measurements of the magnetic field surrounding the first magnetic field sensor from the first magnetic field sensor; obtain measurements of the magnetic field surrounding the second magnetic field sensor from the second magnetic field sensor; when the plunger passes the first magnetic field sensor and the second magnetic field sensor, determine the pass time for the plunger to pass between the first magnetic field sensor and the second magnetic field sensor; and calculate the velocity of the plunger by dividing the sensor distance by the pass time.

In another aspect, a method for determining a velocity of a plunger in a plunger lift system is provided. The method comprises: providing a velocity sensor having a first magnetic field sensor and a second magnetic field sensor spaced a sensor distance apart; determining a pass time for the plunger to pass between the first magnetic field sensor and the second magnetic field sensor; and using the sensor distance and the pass time to calculate the velocity of the plunger as it passes the first magnetic field sensor and the second magnetic field sensor.

In another aspect, a controller for controlling the operation of a plunger lift system for a gas producing well having a plunger, a plunger velocity sensor and a valve between the well and an outlet line is provided. The controller comprises: at least one processing unit; an input interface operatively connectable to the plunger velocity sensor; an output interface operatively connectable to the valve and operative to open and close the valve; at least one memory containing program instructions. The at least one processing unit is responsive to the program instructions and operative to: open the valve and allow the plunger to rise to a top of the well; in response to receiving a signal from the plunger velocity sensor, close the valve and determine a measured velocity of the plunger proximate a top of the well; using a current afterflow time and a difference between a target plunger velocity and the measured velocity calculate an adjusted afterflow time; after the adjusted afterflow time has passed, close the valve and keep the valve closed for a close time; and repeat the steps of the method, each time calculating a new adjusted afterflow time and keeping the control valve open for the new adjusted afterflow time.

In a further aspect, a method of operating a plunger lift system in a gas producing well is provided. The method comprises: opening a control valve and allowing a plunger to rise to a top of the well; measuring a velocity of the plunger using a velocity sensor positioned proximate the top of the well; using a current afterflow time and a difference between a target velocity and the actual velocity to calculate an adjusted afterflow time; allowing the adjusted afterflow time to pass before closing the control valve and keeping the valve closed for a close time; and repeating the steps of the method, each time calculating a new adjusted afterflow time and keeping the control valve open for the new adjusted afterflow time.

In a further aspect, a method of operating a plunger lift system in a gas producing well is provided. The method comprises: opening a control valve and allowing a plunger to rise to a top of the well; measuring a plunger velocity indicating a velocity of the plunger using a velocity sensor positioned proximate the top of the well; allowing an afterflow time to pass before closing the control valve and keeping the valve closed for a close time; repeating the steps of the method; and if a measured plunger velocity exceeds a threshold velocity, shutting down the well.

In another aspect, a plunger lift system for removing fluids from a well is provided. The system comprises: a wellhead provided at a top of the well and having a plunger receiver; production tubing connected to the well head and extending downwards down the well, the plunger receiver operatively connected to a top end of the production tubing; a plunger provided in the production tubing; an outlet line connected to the well head below the plunger receiver and fluidly connected with the production tubing; a control valve connected inline with the outlet line; a velocity sensor positioned on the outside of the plunger receiver to measure the velocity of the plunger as the plunger enters the plunger receiver; and a controller operatively connected to the velocity sensor to receive velocity data from the velocity sensor and operatively connected to the control valve to open and close the control valve.

DESCRIPTION OF THE DRAWINGS

A preferred embodiment is described below with reference to the accompanying drawings, in which.

DETAILED DESCRIPTION OF THE ILLUSTRATED EMBODIMENTS

Figure 1:
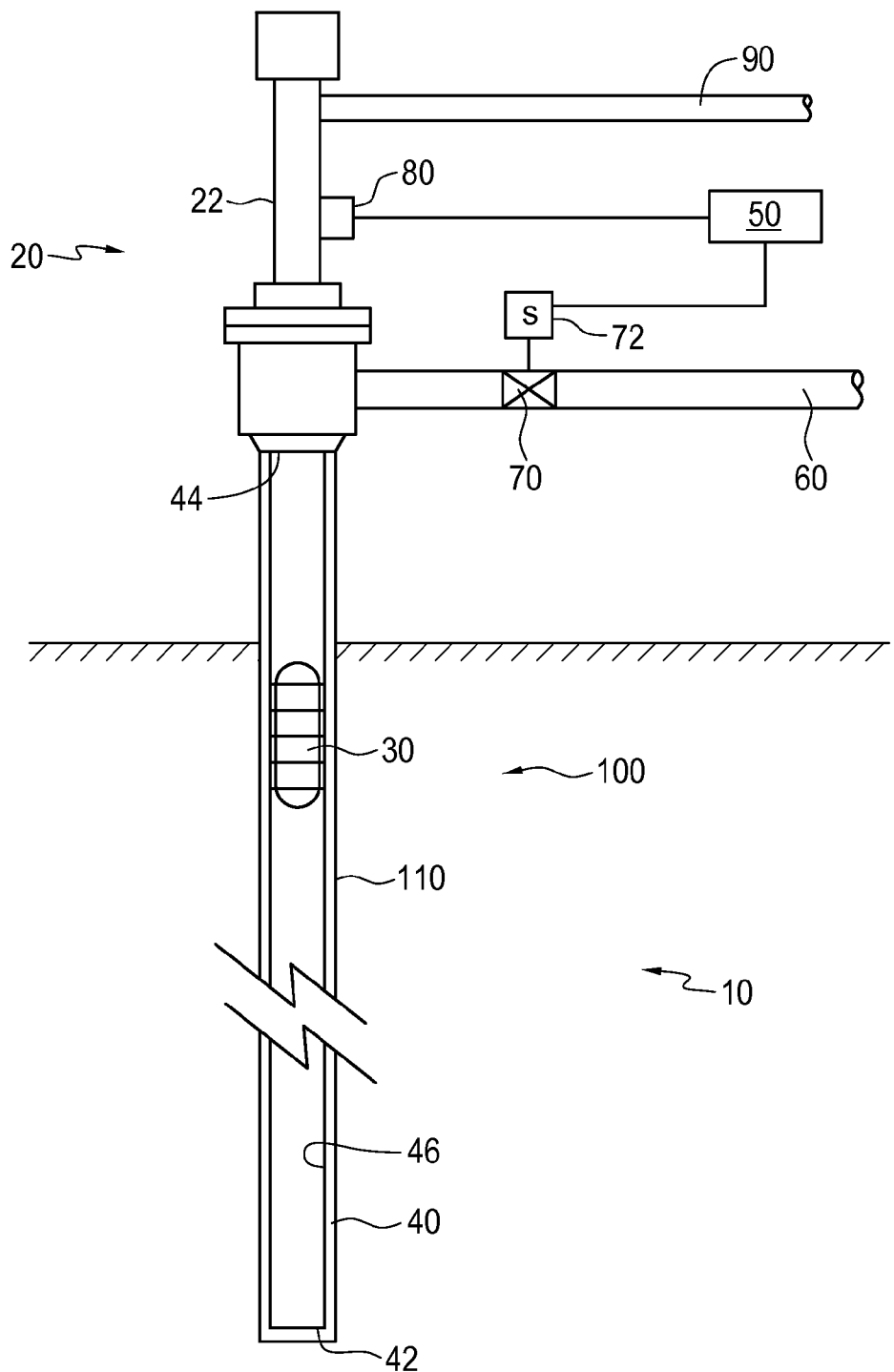
FIG. 1 illustrates a plunger lift system.

FIG. 1 illustrates a plunger lift system 10 for removing fluids from a well 100. The plunger lift system 10 can include: a wellhead 20: a plunger 30; production tubing 40; a controller 50; an outlet line 60; a control valve 70; a velocity sensor 80; a discharge line 90; and other equipment for the operation of the plunger lift system 10.

The well 100 is typically provided with a well casing 110. Production tubing 40 can be provided running down the well casing 110 between the wellhead 20 and the bottom 42 of the production tubing 40.

The plunger 30 can be provided in the production tubing 40 so that the plunger 30 is able to move up and down in the production tubing 40. The plunger 30 can form a seal with the wall 46 of the production tubing 40 to prevent significant amounts of fluids from passing around the plunger 30 between the outside of the plunger 30 and the wall 46 of the production tubing 40.

The wellhead 20 can be provided at a top of the well casing 110 and the production tubing 40. The wellhead 20 can fluidly connect the production tubing 40 and the well casing 110 to the outlet line 60. The outlet line 60 routes gas out of the well 100 for transport or collection. A control valve 70 can be provided between the outlet line 60 and the well 100.

The wellhead 20 can include a plunger receiver 22 operatively connected to a top end 44 of the production tubing 40 and above where the outlet line 60 is connected. At the top of its travel, the plunger 30 can enter the plunger receiver 22 and be held in place in the plunger receiver 22 entirely above where the outlet line 60 connects with the well 100.

A velocity sensor 80 can be positioned on the outside of the plunger receiver 22 so that the plunger 30 will pass by the velocity sensor 80 when the plunger 30 enters the plunger receiver 22.

A discharge line 90 can be connected to the plunger receiver 22 so that fluids pushed into the plunger receiver 22 by the plunger 30 can be removed from the plunger receiver 22. In some cases, these fluids may be routed through a separator (not shown) so that unwanted liquids and other contaminants can be removed from the plunger receiver 22. If the plunger lift system 10 is being used to produce oil (or other saleable liquids) from the well 100, the oil is discharged out of the plunger lift system 10 through this discharge line 90.

Figure 2:
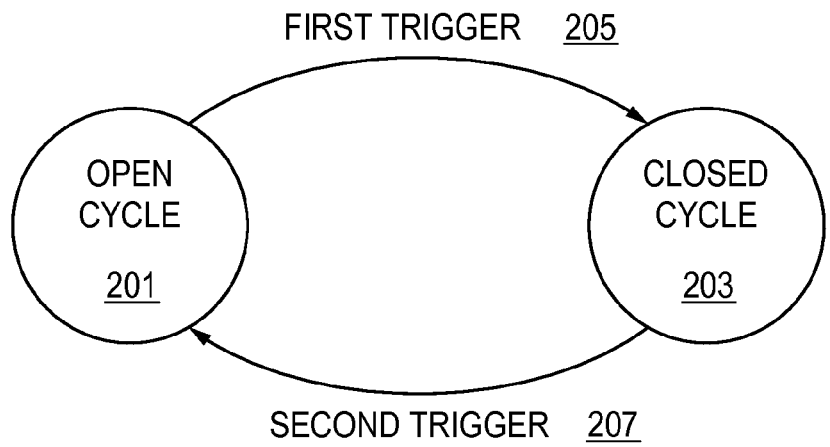
FIG. 2 is a state diagram showing the two modes of operation of the plunger lift system.

Referring to FIG. 2, the plunger lift system 10 alternates between an open cycle 201 (or production cycle) where the control valve 70 is opened and gas is flowing out of the well 100 through the outlet line 60 and a closed cycle 203 (or shut in cycle) where the control valve 70 is closed and gas is prevented from flowing out of the well 100 into the outlet line 60 allowing the pressure in the well 100 to increase. A first trigger 205 will cause the plunger lift system 10 to change from operating in the open cycle 201 to operating in the closed cycle 203 and a second trigger 207 will cause it to move from the closed cycle 203 to the open cycle 201. Typically, this first trigger 205 is the closing of the valve 70 and the second trigger 207 is an opening of the valve 70.

During the closed cycle 203, when the control valve 70 is closed and gas cannot flow out of the well 100 to the outlet line 60, the plunger 30 can drop down the well 100 to a position proximate the bottom of the well 100. When the closed cycle 203 is finished and the control valve 70 is opened, pressure that has built up in the well 100 causes the plunger 30 to rise up the production tubing 40 to the wellhead 20 and into the plunger receiver 22. Once the plunger 30 is in place in the plunger receiver 22, the control valve 70 can remain open and gas can be produced from the well 100 by allowing it to flow into the outlet line 60. Any fluid brought up the well 100 above the plunger 30 can be discharged out the discharge line 90. The time the control valve 70 is opened is the open cycle 201.

Once the open cycle ends 201 and the control valve 70 is closed, the plunger 30 can be released by the plunger receiver 22 and the weight of the plunger 30 can cause it to drop back down the production tubing 40 to the bottom of the well 100. As the closed cycle 203 continues and the control valve 70 remains closed, the pressure in the well 100 can increase. When the pressure has increased to a sufficient level, the control valve 70 can once again be opened and the open cycle 201 can begin and the plunger 30 can begin to rise to the top of the well 100.

When the plunger lift system 10 is used to produce gas from the well 100, it is desirable to maximize the time the plunger lift system 10 remains in the open cycle 201 so that as much time as possible is spent producing gas from the well 100 during this open cycle 201, but not have the open cycle 201 occur for so long that the well 100 waters in and the well 100 stops flowing gas because the weight of water in the well 100 and the plunger 30 is too great for the pressure of the gas below the plunger 30 to lift the plunger 30 up the well 100.

When the plunger lift system 10 is used to produce oil from the well 100, it is desirable to adjust the time the plunger lift system 10 remains in the closed cycle 203, allowing the plunger 30 to make as many trips as possible up the well 100, bringing up as much oil as it can carry, but not have the time set so long that too much oil is allowed to accumulate on top of the plunger 30 causing the oil and the plunger 30 to weigh so much that the pressure of the gas below the plunger 30 cannot lift the plunger 30 and the accumulated oil on top of the plunger 30 up the well 100.

Figure 3:
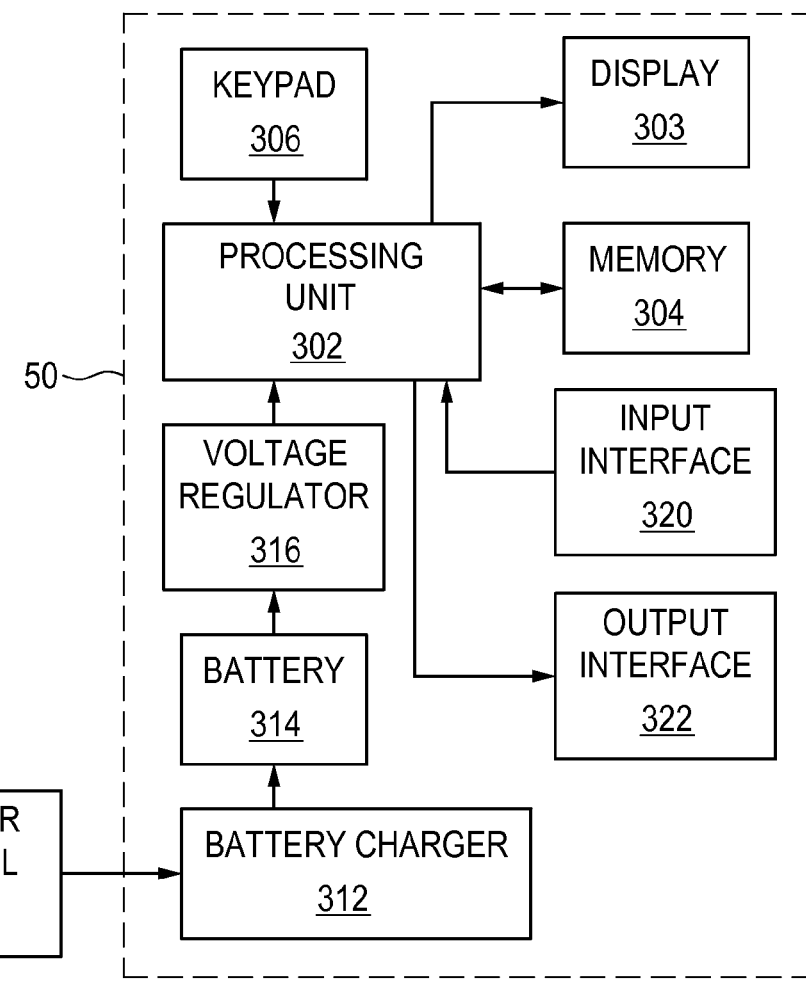
FIG. 3 is a schematic illustration of a controller used in the plunger lift system.

FIG. 3 illustrates a controller 50 that can be used to control the operation of the plunger lift system 10 and alter the operation of the plunger lift system 10 between the open cycle and the closed cycle. Referring again to FIG. 1, the controller 50 can be operably connected to the solenoid 72 so that by sending signals to the solenoid 72 the controller 50 can cause the opening and closing of the control valve 70. The controller 50 can also be operatively connected to the velocity sensor 80 so that the controller 50 can receive output from the velocity sensor 80 that the controller 50 can then use to approximate the speed of the plunger 30 as it passes the velocity sensor 80.

Referring again to FIG. 3, the controller 50 can include a processing unit 302, such a microprocessor that is operatively connected to a computer readable memory 304 and can control the operation of the controller 50. Program instructions for controlling the operation of the processing unit 302 can be stored in the memory 304 as well as any additional data needed for the operation of the controller 50. A keypad 306 and a display 303 can be provided to allow a user to see the settings of the controller 50 and enter inputs and change parameters of the controller 50. An input interface 320 can be provided operatively connected to the processing unit 302 so that the controller 50 can receive signals from external sensors. The velocity sensor 80 can be connected to the input interface 320 to allow signals from the velocity sensor 80 to be transmitted to the controller 50. An output interface 322 can be provided operatively connected to the processing unit 302 to send signals to other devices in the plunger lift system 10. For example, the solenoid 72 attached to the control valve 70 can be connected to the output interface 322 so that the controller 50 can send signals to the solenoid 72.

Because the controller 50 is frequently used in a remote location because the well 100 the controller 50 is being used with is located in a remote location, the controller 50 can be connected to a solar panel 310 that supplies power to controller 50. A battery 314 can be provided to power the processing unit 302 and the battery 314 can be charged with a battery charger 312 connected to the solar panel 310. A voltage regulator 316 can be provided between the processing unit 302 and the battery 314 to provide the proper voltage to the processing unit 302.

The controller 50 can include a weatherproof enclosure for protecting the components of the controller 50 from the elements.

When the plunger lift system 10 is used to produce gas from the well 100, ideally the length of the afterflow is maximized without this afterflow time being so long that the well 100 will water in during this afterflow time. At the same time, the close time can be minimized, simply providing enough time for the plunger 30 to reach the bottom of the well 100 and collect the water that has collected there before the valve 70 is once again opened and the plunger 30 is used to carry the water to the top of the well 100 and gas is once more being produced from the well 100.

Figure 4:
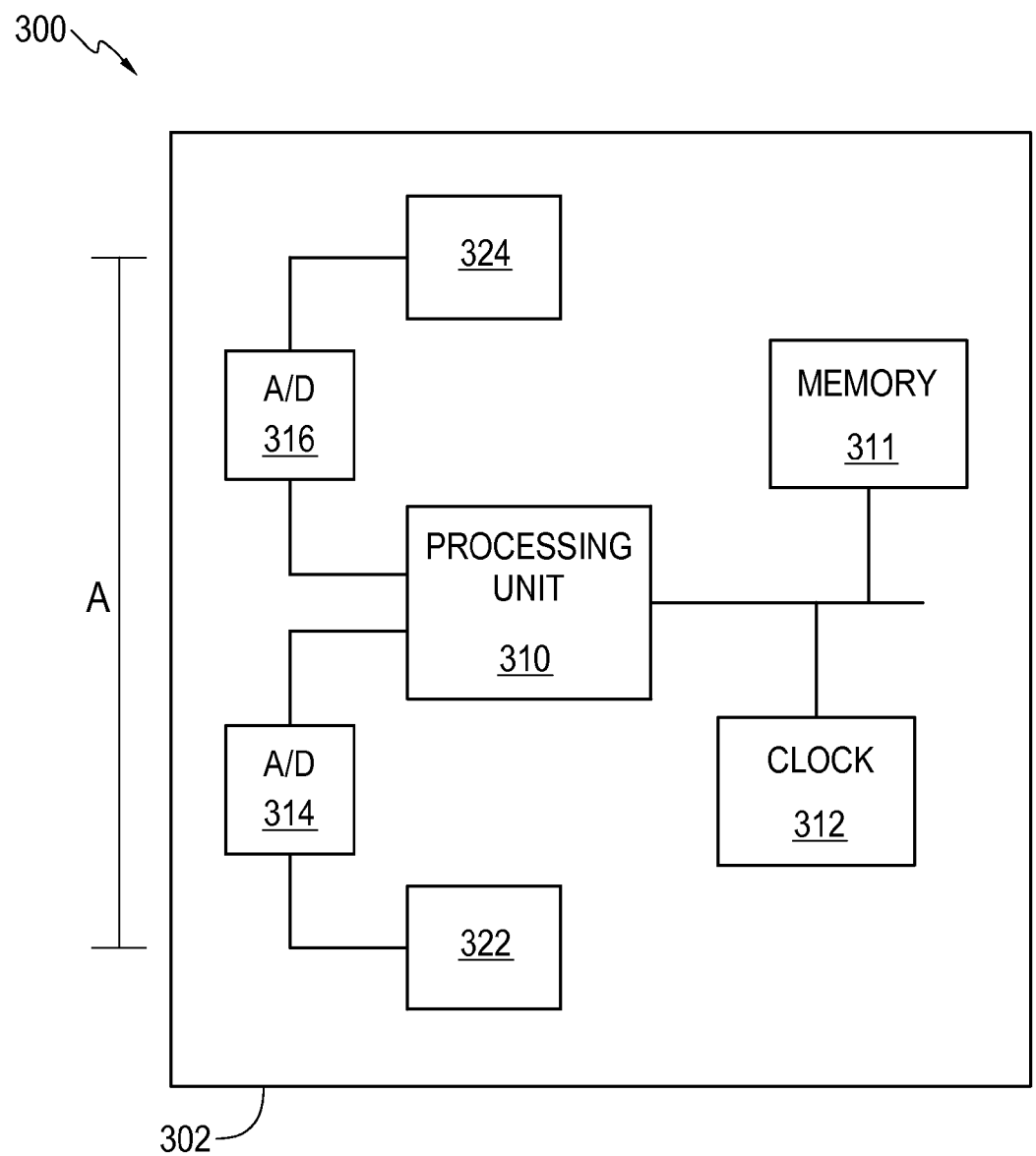
FIG. 4 is a schematic illustration of a velocity sensor.

FIG. 4 is a schematic illustration of one embodiment of a velocity sensor 300 that can be used for approximating the velocity of the plunger 30 as it arrives in the plunger receiver 22. Velocity sensor 300 can be used for the velocity sensor 80 shown in FIG. 1. The velocity sensor 300 can comprise a single circuit board 302 on which the various components are provided. The velocity sensor 300 can have two magnetic field sensors 322, 324 to allow the velocity sensor 300 to measure the effect the passing of the plunger 30 has on the magnetic fields surrounding the magnetic field sensors 322, 324. This change to the magnetic fields and the known distance between the magnetic field sensors 322, 324 can then be used to approximate the velocity of the plunger 30 as it passes by the velocity sensor 300.

The velocity sensor 300 can have a single processing unit 310, such as a microprocessor, that can be provided on the circuit board 302. The processing unit 310 can be operatively connected to a memory 311 which can provide the processing unit 310 with instructions to execute. The processing unit 310 can also be operatively connected to a single clock 312 that provides the processing unit 310 with a single clock signal.

A first analog/digital convertor 314 and a second analog/digital convertor 316 can be operatively connected to the processing unit 310. In turn, magnetic field sensor 322 can be connected to the first analog/digital convertor 314 and magnetic field sensor 324 can be connected to the second analog/digital convertor 316. The magnetic field sensor 322 can be any suitable magnetic field sensor that measures the strength of a magnetic field in proximity to the magnetic field sensor and outputs a voltage that is proportional to the strength of the magnetic field. In this manner, the processing unit 302 can sample the magnetic field sensor 322 using the first analog/digital convertor 314 and then the magnetic field sensor 324 using the second analog/digital convertor 316. By using a single clock signal to alternately sample the first analog/digital convertor 314 and the second analog/digital convertor 316, the processing unit 310 can obtain a more accurate output.

In another aspect, the magnetic field sensors 322, 324 can be positioned inline with one another on the circuit board 302 and can be spaced an exact known distance apart from each other on the circuit board 302 so that the processing unit 310 or other device analyzing the signals from these magnetic field sensors 322, 324 knows very accurately how far the distance between the different sensors is. For example, magnetic field sensors 322 and 324 can be spaced apart by a sensor distance A. In one aspect, A could be 20 cm or less. In some aspects, this sensor distance could be 15 cm, 10 cm, 5 cm or even less. Because of the high tolerances of circuit manufacturing, by providing the magnetic field sensors 322, 324 on the single circuit board 302, the distances between them will be very accurate and should vary little between different circuit boards 302 as a result of the manufacturing process.

Although not shown in FIG. 4, the velocity sensor can have a number of other components for its operation including a housing for protecting the velocity sensor 300 from the elements and allowing it to be attached to the well head 20, a power cable to supply power to the circuit board 302, processing unit 310, magnetic field sensors 322, 324, etc, and a data cable to transmit data from the velocity sensor 300 to the controller 50.

In operation, the velocity sensor 300 can be used to approximate the velocity of the plunger 30 as it passes the velocity sensor 300. The velocity sensor 300 can be positioned on the plunger receiver 22 so that the magnetic field sensors 322, 324 are positioned in a vertical line that is substantially parallel to the path taken by the plunger 30 as the plunger 30 passes into the plunger receiver 22. In this manner, the plunger 30 passes the magnetic field sensors 322, 324, consecutively, and travels the sensor distance A between the magnetic field sensors 322, 324. For example, if the velocity sensor 300 is positioned on the plunger receiver 22 so that the magnetic field sensor 322 is positioned at the bottom, the magnetic field sensor 324 will then be positioned vertically above and inline with magnetic field sensor 322. A plunger 30 entering the plunger receiver 22 and passing the velocity sensor 300 will first pass the magnetic field sensor, 322, then in turn pass magnetic field sensor 324, in that order, travelling in a line parallel to a line passing through the magnetic field sensors 322, 324.

Plungers used in plunger lift systems typically are made of at least some ferrous metal. This will cause the plunger 30 to affect magnetic fields surrounding the magnetic field sensors 322, 324 as the plunger 30 approaches and then passes by them. As the plunger 30 approaches one of the magnetic field sensors 322, 324, the plunger 30 will affect the magnetic field surrounding the magnetic field sensor 322, 324 and this magnetic field's strength will be altered. The magnetic field sensor 322, 324 can be used to repeatedly measure the strength of the magnetic field around the magnetic field sensors 322, 324 and output a voltage representing the strength of this measured magnetic field. The processing unit 310 can sample these voltage outputs and by having the processing unit 310 repeatedly sampling the magnetic field sensors 322, 324 using the first analog/digital convertor 314 and the second analog/digital convertor 316, the processing unit 310 can obtain the change in the magnetic fields surrounding the magnetic field sensors 322, 324 over time and construct a waveform showing the changes in these magnetic fields.

Figure 5:
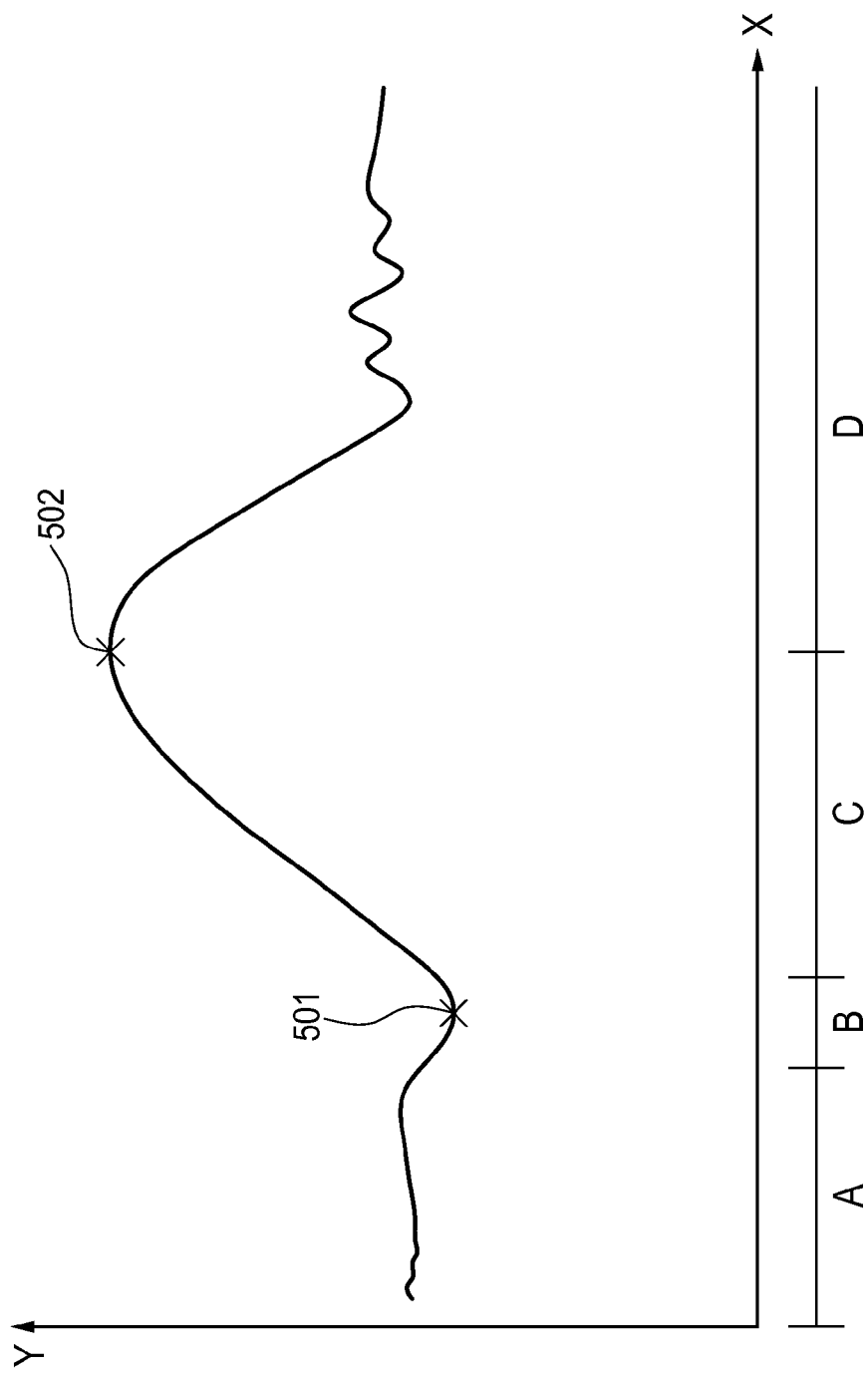
FIG. 5 illustrates a waveform outputted by a magnetic field sensor when a plunger passes the magnetic field sensor.

Experimentation with different plungers has shown that a waveform created by sampling the output voltages of a magnetic field sensor over time will have a number of common features that appear to be present for a wide range of different plungers. This experimentation has shown that different plungers will typically all have a waveform that resembles the waveform shown in FIG. 5. In the graph of FIG. 5, the x-axis is plotted as time while the y-axis is the magnitude of the magnetic field measured by the magnetic field sensor. In some cases, the waveform could be flipped (appear upside down relative to this waveform) if the magnetic field sensors 322, 324 are rotated 180° or the entire velocity sensor 300 is rotated 180°.

The waveform has three distinct portions, A, B and C, which appear to be common to most plungers. Before the plunger gets close to the magnetic field sensor, the magnetic field sensor will typically just be reading the background magnetic field surrounding the sensor. This portion of the waveform is labeled with an A and can fluctuate slightly around a specific magnitude because of background magnetic fields. As the plunger approaches the magnetic field sensor, the magnitude of the magnetic field dips. This dip is labeled as portion B in FIG. 5. Experimentation shows that the extent of this dip can vary between different plungers and the magnetic field sensors used. The dip will have a low point 501 where at this point the magnitude of the magnetic field will begin to increase.

After the dip in portion B and the low point 501, the magnitude of the measured magnetic field will then increases until it reaches a peak 502 as the plunger continues to pass by the magnetic field sensor. This increasing of the magnitude is labeled as portion C. Following portion C (portion D) experimentation has shown that the waveforms for different plungers will vary greatly after portion C, with the magnitudes changing quite a bit between different plungers depending on the geometries of the plungers. Additionally, the portion after C can vary depending on whether the plunger stops in the plunger receiver 22 without completely passing the velocity sensor 300 and other factors.

Referring again to FIG. 4, by using the output of the magnetic field sensor 322 connected to the first analog/digital controller 314 and the output of the magnetic field sensor 324 connected to the second analog/digital convertor 316, the velocity sensor 300 can be used to approximate the velocity of the plunger 30 as it passes by the velocity sensor 300.

In one aspect, the velocity sensor 300 may be used to approximate a velocity of the plunger 30 using the output of one of the magnetic field sensors 322, 324. The waveform output of the magnetic field sensors 322, 324 will take a form similar to the waveform shown in FIG. 5. Experimentation with different plungers has shown that for each type of plunger, the waveform outputted as it passes the magnetic field sensor will have the same basic shape, but will be more compact the higher the velocity of the plunger when it passes the magnetic field sensor. Experimentation has shown that the velocity of the plunger is related to the slope of the line in portion C of the waveform with the greater the measure slope, the greater the velocity. However, this is not a direct relationship and will vary from plunger type to plunger type so an empirical formula will have to be determined through experimentation for each type of plunger type, relating the slope of the portion C of the waveform to the velocity of that particular plunger type. This empirical formula determined for a specific type of plunger and the slope of the waveform in portion C can then be used to approximate the velocity of the plunger 30 as it passes the velocity sensor 300.

In one aspect, if the velocity of the plunger 30 is being determined using the slope on a waveform from the output of a single magnetic field sensor, the velocity sensor 80 used in the plunger lift system 10 could have only a single magnetic field sensor rather than two as used in velocity sensor 300.

Figure 6:
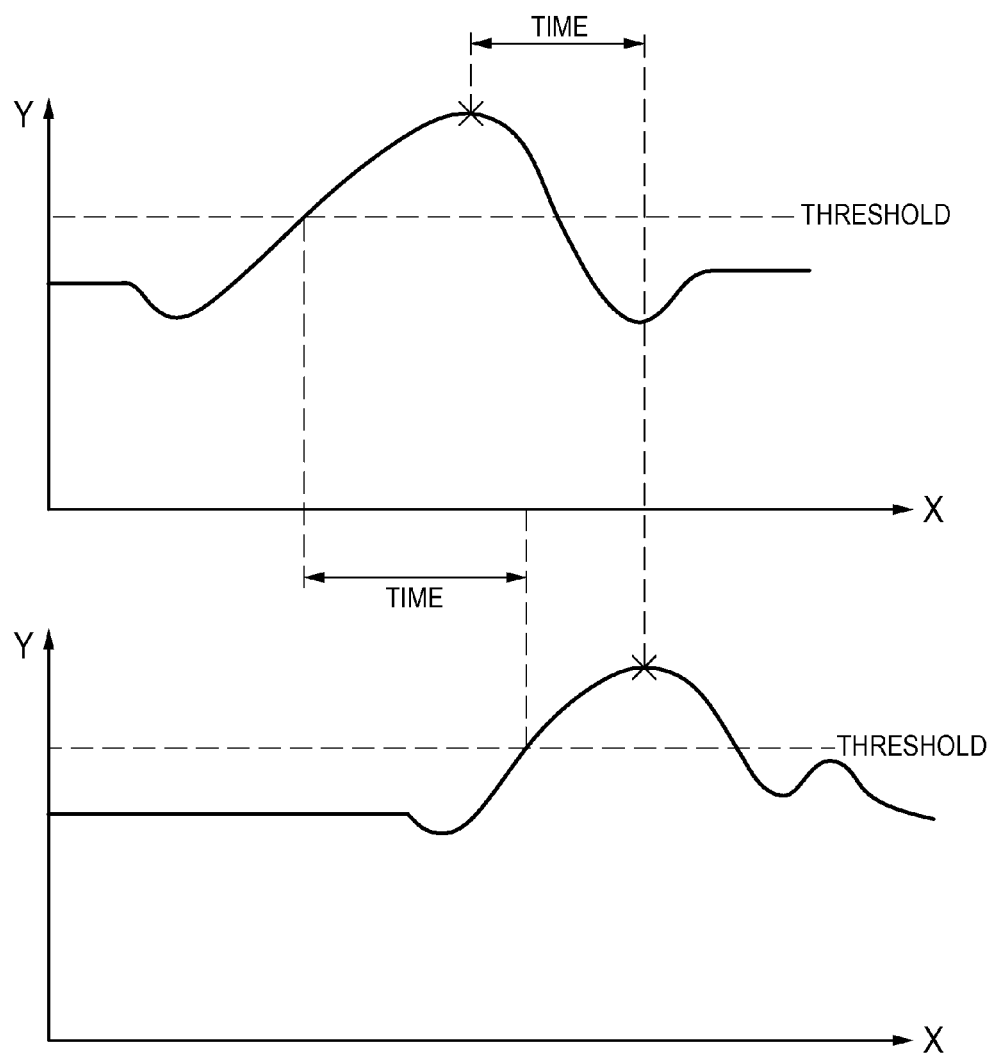
FIG. 6 illustrates two waveforms output by the velocity sensor from two magnetic field sensors used to approximate the velocity of the plunger.

The velocity of the plunger 30 can also be approximated using the waveforms outputted by both magnetic field sensors 322, 324. FIG. 6 shows two waveforms with the top waveform being outputted by one of the magnetic field sensors 322, 324 connected to the first analog digital convertor 314 and the bottom waveform being outputted by one of the magnetic field sensors 322, 324 connected to the second analog digital convertor 316 if the velocity sensor 300 is positioned on the plunger receiver 22 so that the magnetic field sensor 322 is positioned below magnetic field sensor 324.

The plunger 30 will first pass the lower magnetic field sensor 322 creating the top waveform shown in FIG. 6. First the magnitude of the surrounding magnetic field will dip followed by an increase. Next the plunger 30 will approach the upper magnetic field sensor 324 creating first a dip in measured magnetic field strength followed by an increase. The controller 50 can then use these two waveforms to determine a pass time, the time it has taken the plunger 30 to pass between the magnetic field sensors. By using the known sensor distance A between the two magnetic field sensors 322, 324 and the pass time, the velocity the plunger 30 is travelling at can be calculated. As known in the art, the processing unit 310 can obtain a more accurate waveform from the magnetic field sensors 322, 324 by sampling at a faster rate.

To determine the pass time for the plunger 30 to pass between the magnetic field sensors 322, 324, the controller 50 will have to determine when the plunger 30 has passed the first magnetic field sensor 322 being sampled using the first analog/digital convertor 314 and when the plunger 30 has passed the second magnetic field sensor 324 being sampled using the second analog/digital convertor 316. This can be done in a number of ways including threshold detection, peak detection and baseline crossing detection.

With threshold detection, the first magnetic field sensor 322 and the second magnetic field sensor 324 are calibrated so that the amplitude outputted by each magnetic field sensor 322, 324 is the same (or if the outputted amplitudes are different equated to one another somehow). Then a threshold value can be set that the measured magnetic field will surpass as the plunger 30 passes the magnetic field sensor 322, 324. Because there will typically be some variances in the magnetic fields surrounding the first magnetic field sensor 322 and the second magnetic field sensor 324, the background reading of these magnetic field sensors 322, 324 may not always be the same, but rather, the baseline reading may vary higher or lower at different times. The threshold value should be set so that it is greater than these typical variances so that a slight variance in the background magnetic fields are not treated as a measurement of the plunger 30 passing the magnetic field sensors 322, 324, but instead the threshold value is only surpassed when the plunger 30 passes the magnetic field sensors 322, 324. The threshold value can be set either above or below the baseline or even a pair of threshold values, with one above and one set below the baseline value.

Figure 7:
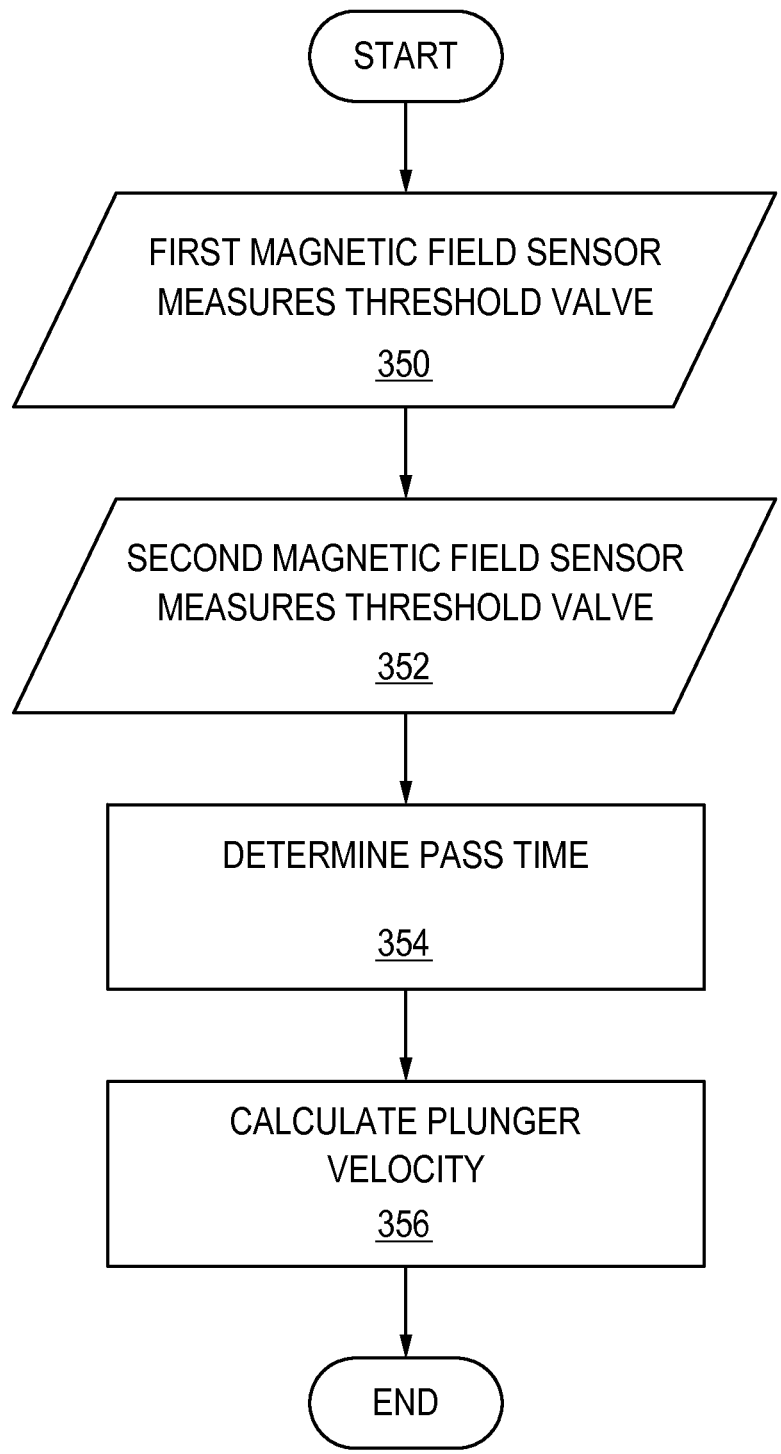
FIG. 7 illustrates a flowchart of a method for calculating a velocity of a plunger in a plunger lift system.

FIG. 7 illustrates a flow chart of a method for calculating the velocity of the plunger 30 using threshold detection. The method will start and the first magnetic field sensor 322 and the second magnetic field sensor 324 will continuously obtain measurements of the strength of the magnetic fields surrounding them. Typically, these measurements will be close to a baseline measurement as they measure the background magnetic fields but can vary higher or lower than this baseline value a bit. When the plunger approaches the first magnetic field sensor 322, the magnetic field strength being measured by the first magnetic field sensor 322 will change and eventually reach and surpass the threshold value at step 350. At step 352 the second magnetic field sensor 324 will measure the crossing of the threshold value as the plunger 30 approaches and then passes the second magnetic field sensor 324. At step 354 the method can determine a pass time based on the time the threshold value being crossed was measured by the first magnetic sensor 322 at step 350 and the time the threshold value being crossed was measured by the second magnetic field sensor 324 at step 352. With the pass time determined at step 354, the velocity of the plunger 30 as it passes the velocity sensor 300 can be calculated at step 356 using the sensor distance divided by the pass time.

With peak to peak detection, after a certain threshold value is surpassed the time the first peak occurs in the waveform outputted by the first magnetic field sensor 322 can be compared to the time the first peak occurs in the waveform outputted by the second magnetic sensor 324. The threshold value can be used to prevent fluctuations in the background magnetic field mistakenly being taken for the arrival of the plunger 30. The time between these peaks can then be used with the sensor distance A between the first magnetic field sensor 322 and the second magnetic field sensor 324 to approximate a velocity of the plunger 30 as it passes the velocity sensor 300.

Additionally, the peak to peak detection method can be used with more than one peak on each waveform to try and increase the accuracy of the calculated plunger velocity. In addition to the first peak on each waveform, the time the next subsequent peak occurs can also be determined for the waveforms outputted by the first magnetic field sensor 322 and the second magnetic field sensor 324. These times can then be used to determine a second velocity using the distance A between the two magnetic field sensors 322, 324 and this second velocity can be averaged with the velocity determined using the first peaks to approximate a velocity of the plunger 30 passing the velocity sensor 300.

In some aspects, more than two peaks may be used to approximate the velocity of the plunger 30 with each subsequent peak being used to approximate a different velocity and then averaging all of the velocities together. Alternatively, the times between the different peaks can be averaged and the average time then used with the sensor distance to determine a velocity of the plunger 30 as it passes the velocity sensor 300.

With baseline crossing detection, the first magnetic field sensor 322 and the second magnetic field sensor 324 will be repeatedly measuring a baseline value or a value that deviates slightly from this baseline while the plunger 30 is not near the magnetic field sensors 322, 324. This will be a measurement of typical background magnetic fields around the velocity sensor 300 when the plunger 30 is not in close proximity to the velocity sensor 300. When the plunger 30 gets close to and begins to pass the first magnetic sensor 322 and the second magnetic sensor 324, the measurements of the magnetic field will start to vary significantly off this baseline value as the plunger 30 approaches.

Figure 8:
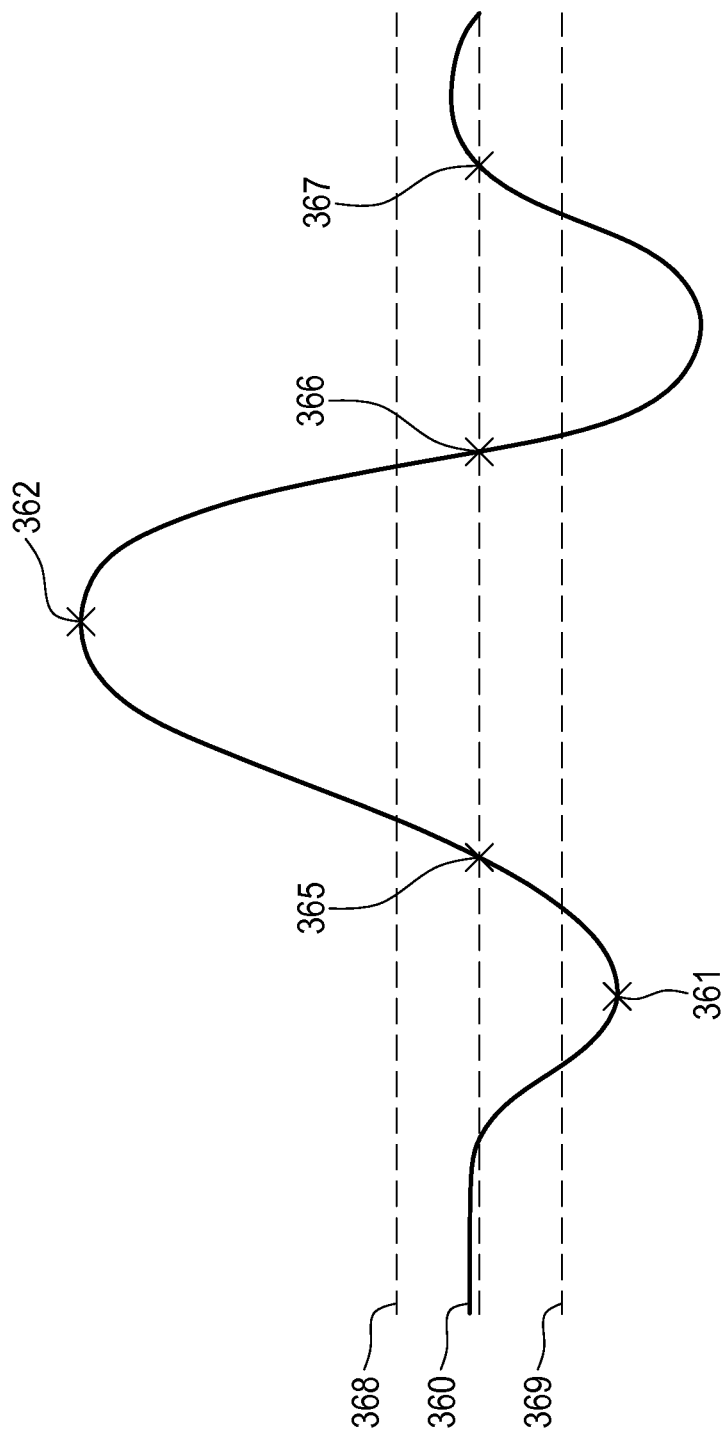
FIG. 8 illustrates a waveform outputted by a magnetic field sensor that can be used to determine velocity of a plunger using a baseline crossing detection method.

FIG. 8 illustrates an example of a waveform that results from a plunger approaching and passing a magnetic field sensor. A baseline value 360 is shown which would be the magnetic field strength being measured by the magnetic field sensor while the plunger 30 is not close to the magnetic field sensor and only the background magnetic fields are being measured. As the plunger 30 approaches the magnetic field sensor, the measured values will typically move off the baseline value 360 and decrease as the plunger 30 gets closer (or higher depending on the configuration of the magnetic field sensor). As the plunger 30 continues to approach the magnetic field sensor, these measured values will reach a lower peak 361 where they will start to once again increase in value as the plunger 30 continues to approach and passes the magnetic field sensor. During this increase in measured values, the baseline value 360 will be re-crossed at a first point 365 as the measured values continue to increase over time. These values will continue to increase to an upper peak 362 where the measured values will once again start to decrease in magnitude and can once again re-cross the baseline value 360 at a second point 366 before eventually returning the baseline value 360 if the plunger 30 is able to completely pass by the magnetic field sensor. Before reaching the baseline value 360 again, the measured values could re-cross the baseline value 360 a number of times. FIG. 8 illustrates a third point 367 where the values re-cross the baseline value 360.

An upper threshold value 368 and a lower threshold value 369 can be used to try and distinguish the situation where a plunger 30 is approaching the magnetic field sensor from other situations where the background magnetic fields being measured vary from the baseline value 360 because of conditions surrounding the magnetic field sensor have been changed but the plunger 30 is not near the magnetic field sensor.

Figure 9:
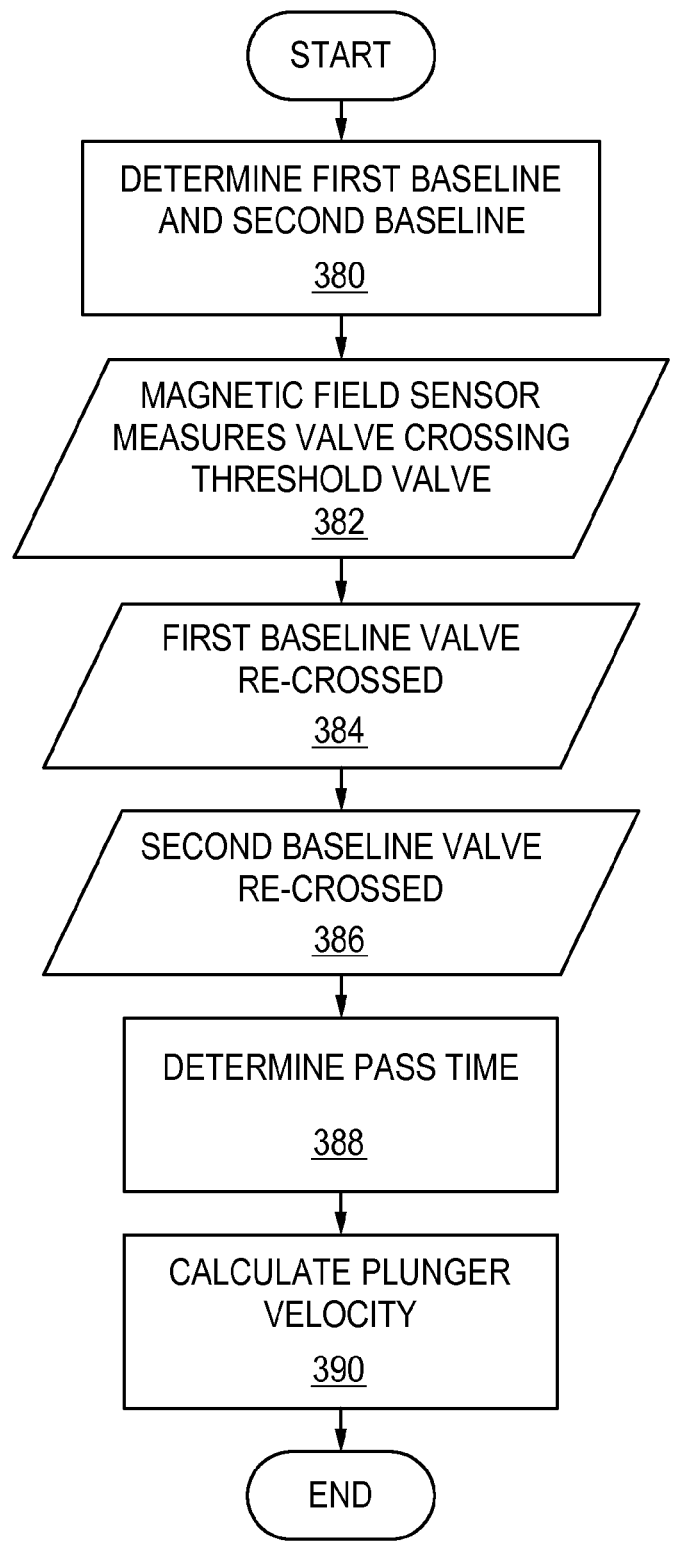
FIG. 9 illustrates a flowchart of a method for determining a plunger velocity based on baseline crossing detection.

FIG. 9 illustrates a method of calculating a velocity of a plunger using a baseline crossing detection method. The method can start and a first baseline value is determined for the first magnetic field sensor 322 and second baseline value is determined for the second magnetic field sensor 324. The first baseline value will be a measurement of the background magnetic fields surrounding the first magnetic field sensor 322 when the plunger 30 is not near the first magnetic field sensor 322 and the second baseline values will be a measurement of background magnetic fields surrounding the second magnetic field sensor 324 when the plunger 30 is not near the second magnetic field sensor 324. The first baseline and the second baseline can be quite different from one another because the first magnetic field sensor 322 and the second magnetic field sensor 324 can be reading much different from the other and/or have different background magnetic fields surrounding them.

The first magnetic field sensor 322 and the second magnetic field sensor 324 will repeatedly measure the surrounding magnetic fields. When the plunger 30 is not close to the magnetic field sensors 322, 324 they should be measuring a value around the first baseline value and the second baseline value, respectively. As the plunger 30 begins to approach the first magnetic field sensor 322, the first magnetic field sensor 322 will measure a value that surpasses either the upper threshold value or the lower threshold value at step 382 indicating that the values being measured by the first magnetic field sensor 322 have deviated significantly from the first baseline value because the plunger 30 is approaching the first magnetic field sensor 322.

The first magnetic field sensor 322 can then continue to measure the values until the first baseline value is re-crossed for the first time by the measured values at step 384. At step 386 the second magnetic sensor 324 can measure a value indicating a re-crossing of the second baseline value by the measured magnetic fields.

With the time the first baseline value was first re-crossed at step 384 and the time the second baseline value was first re-crossed at step 386, the pass time can be determined at step 388 using the time that passed between these two events and at step 390 the velocity of the plunger 30 passing the velocity sensor 300 can be determined using the sensor distance divided by the pass time.

In a further aspect, the velocity of the plunger 30 can be calculated by using two or more re-crossings of the baseline. Each time the first magnetic field sensor 322 and the second magnetic field sensor 324 measures a value re-crossing the first baseline value and the second baseline value, respectively, a new pass time can be determined and used to either calculate a new plunger velocity so that all the calculated plunger velocities can be averaged together or all of the determined pass times can be averaged together and the sensor distance divided by the average pass time. A new pass time can be determined for each matching pair of measured values re-crossing the first baseline value and the second baseline value.

In one aspect, if multiple re-crossing of the baseline values are being used to calculate a final plunger velocity, the method can be given a timeout where further re-crossing of the baseline will not be used to calculate further plunger velocities. This can be used to prevent the situation where a plunger 30 does not completely pass the velocity sensor 300 but instead stays in the plunger receiver 22 possibly bouncing in place and causing readings by the magnetic field sensors 322, 324 to continue to fluctuate.

Baseline crossing detection can be used without having to calibrate the magnetic field sensors 322, 324 relative to one another because it does not matter what the relative magnitudes are of the measurements of the magnetic field sensors 322, 324. Instead, the important points are where the values re-cross the baseline values. It also allows the method to be used without needing any specific plunger information, such as length, material, geometry, etc, because where the waveforms re-cross the baseline values will be the same for both magnetic field sensors 322, 324.

The processing unit 310 of the velocity sensor 300 could be operative to approximate the velocity of the plunger 30 and then this approximated velocity could be transmitted to the controller 50. Alternatively, the velocity sensor 300 could transmit the waveforms outputted from the first magnetic field sensor 322 and the second magnetic field sensor 324 and the controller 50 could use the waveforms received from the velocity sensor 300 to approximate the velocity of the plunger 30 as it passed the velocity sensor 300.

In a further aspect, the velocity sensor 300 could use more than two magnetic field sensors 322, 324 with each magnetic field sensor outputting a waveform as the plunger 30 passes each magnetic field sensor, allowing the velocity sensor 300 to determine the velocity of the plunger 30 by using more than two waveforms to approximate the velocity of the plunger 30 as it passes the velocity sensor 300.

Referring again to FIG. 1, the velocity sensor 80 can be used to measure the velocity of the plunger 30 as it arrives in the plunger receiver 22 to try and prevent the plunger 30 from travelling so fast when it reaches the plunger receiver 22 that it damages the plunger receiver 22; and be used to control the operation of the plunger lift system 10.

The well head 20 can be damaged if the plunger 30 arrives in the plunger receiver 22 traveling too fast. Rather than using the average velocity of the plunger to determine the velocity of the plunger and stopping the operation of the plunger lift system 10 if the average velocity is too high, the plunger lift system 10 measures the velocity of the plunger 30 at the top of the well 100 (when the plunger 30 is entering the plunger receiver 22) using the velocity sensor 80. If the plunger 30 arrives in the well head 20 at too high a speed, the controller 50 can stop the operation of the plunger lift system 10, preventing the well head 20 from suffering any more damage from the plunger 30 hitting the top of the plunger receiver 22 too hard again.

The velocities used to trigger danger conditions will vary based on the type of well head 20 and the weight of the plunger 30, but in one aspect, the controller 50 can be set to shut down the operation of the plunger lift system 10 after several consecutive trips where the velocity of the plunger 30 is measured by the velocity sensor 80 to be over a first threshold. This first threshold would typically be a velocity that a designer believes the wellhead 20 can withstand for a few consecutive trips, but that would eventually cause damage to the well head 20 if it is continuously repeated. In a further aspect, the controller 50 can also be set to immediately shut down the plunger lift system 10 if the velocity measured by the velocity sensor 80 is measured above a second threshold. This second threshold would be higher than the first threshold and typically would be a velocity that a designer believes will cause imminent damage to the wellhead 20 if repeated at all. By shutting down the well 100 at this point, the plunger lift system 10 can stop the well head 20 from being impacted again by the plunger 30. In one aspect, the first threshold can be approximately 310 m/min and the second threshold can be approximately 640 m/min.

In this manner, rather than relying on the average velocity and setting threshold values lower than necessary to take into account the fact that the average velocity may not reflect the actual velocity of the plunger 30 at the top of the well 100, the controller 50 can use the actual measured velocity at the top of the well 100 as measured by the velocity sensor 80, allowing the controller 50 to use a higher threshold before stopping operation of the plunger lift system 10.

In addition to the measured velocity at the plunger receiver 22 being used to try and prevent damage to the wellhead 20, the measured velocity can be used to control the operation of the plunger lift system 10. Rather than using an average velocity based on the trip time of the plunger 30 as it rises from the bottom to the top of the well 100, the controller 50 can use the velocity measured at the top of the well 100 by the velocity sensor 80 to change the afterflow time and/or close time of the plunger lift system 10.

Figure 10:
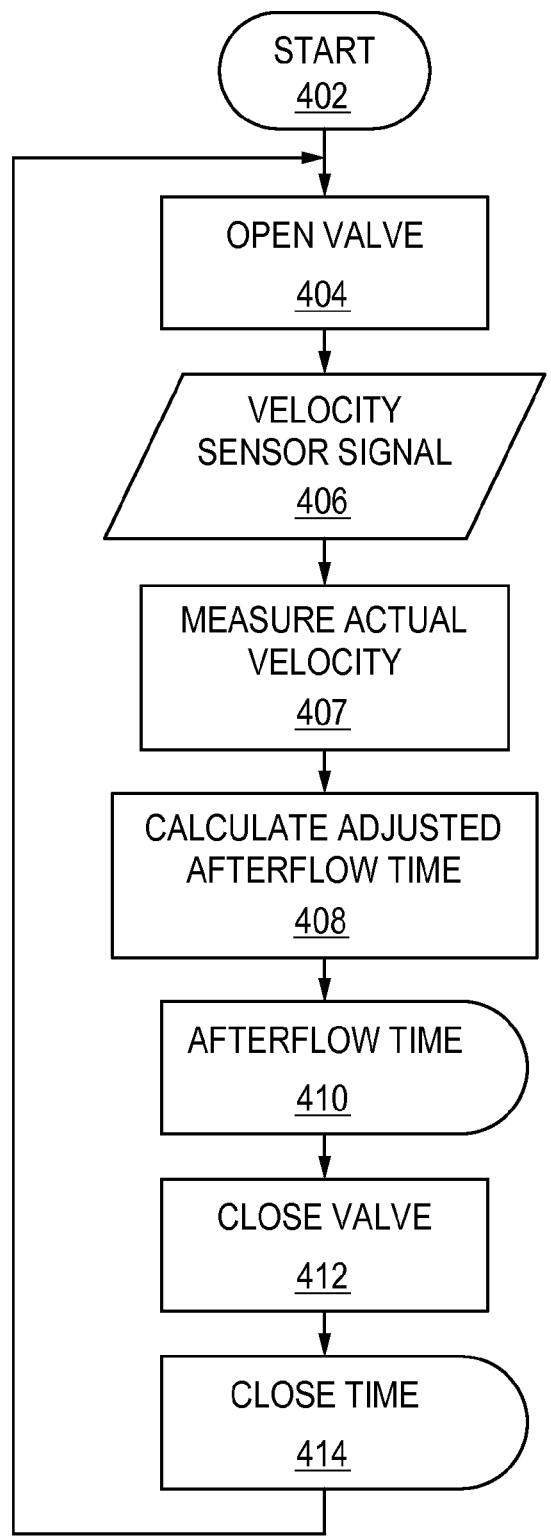
FIG. 10 illustrates a flowchart of a method of controlling the operation of the plunger lift system when the plunger lift system is being used to produce gas and is measuring an actual velocity of the plunger at the top of the well.

FIG. 10 illustrates a flow chart for adjusting the afterflow time of the plunger lift system 10 when the plunger lift system 10 is used to produce gas from the well 100. Before the plunger lift system 10 is used, a user can set an initial afterflow time, a close time and a target velocity. The initial afterflow time will be the time the controller 50 allows the control valve 70 to remain open after the plunger 30 has reached the plunger receiver 22. This initial after flow time will be based on the specific conditions of the well 100, but typically will be a conservative estimate and likely be a relatively short amount of time.

The target velocity is an "ideal" velocity that the plunger 30 is travelling when it reaches the top of the well 100. This target velocity can be based on a velocity that the operator believes is low enough so when the plunger 30 enters the plunger receiver 22 it is travelling slow enough not to cause damage to the well head 20, but not much lower so the plunger 30 can be making the trip up the well 100 as quickly as is practical. In some aspects this target velocity could be 250 m/min.

After the initial afterflow time, close time and target velocity have been set in the controller 50, the plunger lift system 10 can be started at step 402 and the method can begin. When the controller 50 opens the control valve 70 at step 404, the plunger 30 can begin to travel up the production tubing 40 to the top of the well 100 and the well head 20. The control valve 70 can be left opened at step 404 until the plunger 30 reaches the plunger receiver 22 and the controller 50 receives a signal from the velocity sensor 80 indicating that the plunger 30 has passed the velocity sensor 80 at step 406.

Once the plunger 30 arrives in the plunger receiver 22, the controller 50 receives signals from the velocity sensor 80 that indicate that the plunger 30 has reached the plunger receiver 22. These signals will typically take a form similar to the waveform shown in FIG. 5. Not only can the controller 50 use these signals to determine when the plunger 30 has reached the plunger receiver 22, but it can also use the signals to determine the velocity the plunger 30 is moving at when it reaches the plunger receiver 22 at step 407 using one of the methods described herein. Alternatively, the velocity sensor 80 can use the signals to determine the velocity of the plunger 30 as it passes and transmit this determined velocity to the controller 50.

The measured, actual velocity of the plunger 30 at the top of the well 100 is an indicator of how much fluid is being carried up to the surface by the plunger 30. If the actual velocity is less than the target velocity, this suggests that too much water has collected in the well 100 and its weight is slowing the plunger 30 down below the ideal velocity and therefore the afterflow time can be decreased to reduce the amount of water collecting in the well 100 during the afterflow time. Conversely, if the actual velocity is greater than the target velocity, this means that the plunger 30 can be allowed to carry up more water and therefore the afterflow time can be set longer to allow more water to accumulate in the well 100.

With the actual rise time determined at step 407, the method can move onto step 408 and calculate an adjustment for the initial afterflow time as follows:

$$\Delta Afterflowtime = \frac{ActualVelocity - TargetVelocity}{TargetVelocity} \times ScalingFactor \times AfterflowTime \quad (1)$$

where ΔAfterflowTime is the change to be made to the afterflow time, TargetVelocity is the target velocity or ideal velocity the plunger 30 should be traveling at when it reaches the top of the well 100, ActualVelocity is the actual, measured velocity of the plunger 30 at the top of the well 100 as measured by the velocity sensor 80 and determined at step 407, ScalingFactor is a range between 0 and 1 that allows an operator to set how aggressive a change is to be made to afterflow time and the AfterflowTime is the current afterflow time set in the controller 50 (initially this will be the initial afterflow time). The controller 50 can then vary the initial afterflow time by the determined change to be made to the afterflow time to arrive at an adjusted afterflow time as follows:

$$AdjustedAfterflowTime = CurrentAfterflowTime + \Delta AfterflowTime \quad (2)$$

With the adjusted afterflow time determined at step 408, the controller 50 can move on to step 410 and keep the control valve 70 open for this adjusted afterflow time.

At the end of the adjusted afterflow time, the controller 50 moves to step 412 and sends a signal to the solenoid 72 to close the control valve 70, shutting the well 100 in, and the plunger 30 can be released from the plunger receiver 22, causing the plunger 30 to drop back down the well 100 to a position proximate the bottom 42 of the well 100.

At step 414, the controller 50 can leave the control valve 70 closed for the close time to allow the plunger 30 to fall to the bottom of the well 100 and collect the water that has formed in the well 100 on top of the plunger 30. Because the purpose of the method is to produce as much gas from the well 100 as possible, the close time can be set to a minimum value. In one aspect, it can be set to be just enough time for the plunger 30 to drop to the bottom of the well 100. In a further aspect, a plunger drop velocity of 55 m/min can be used in conjunction with the depth of the well 100 to determine a close time consisting of the time for the plunger 30 to drop down the depth of the well 100 and reach the bottom.

After the close time, the controller 50 can return to step 404 and once again send a signal to open the control valve 404 and wait for a signal from the velocity sensor 80 to move onto step 406. The method will keep repeating with the velocity sensor 80 repeatedly measuring the actual velocity of the plunger 30 as it reaches the top of the well 100 at step 407 and then using this newly determined actual velocity to calculate a change to the afterflow time and an adjusted afterflow time at step 408. The adjusted afterflow time is then used at step 410 as the afterflow time for the plunger lift system 10 before the controller 50 once again closes the valve 70 at step 412 and leaves it closed for the close time at step 414. With each repetition of steps of the method, the afterflow time is adjusted, either longer or shorter, using equations (1) and (2) depending on the actual rise time of the plunger 30. In this manner, as the plunger lift system 10 cycles between open cycles, where gas is being produced from the well 100, and closed cycles, where the well 100 is shut in, the controller 50 can use equations (1) and (2) to repeatedly adjust the afterflow time to try and get the plunger 30 to rise at the target rise time.

Over the course of time, the afterflow time can approach the optimum time without any intervention from the operator using incremental adjustments that can increase in size as the afterflow increases and automatically compensate for the common situation where less water is flowing into the well during the afterflow time.

When the plunger lift system 10 is used to produce oil or other saleable fluids from the well 100, the close time can be maximized to allow the greatest amount of fluid to be carried up the well 100 that the gas pressure in the well 100 will allow. At the same time, the afterflow time can be minimized since the gas being produced from the well 100 is not the main consideration.

Figure 11:
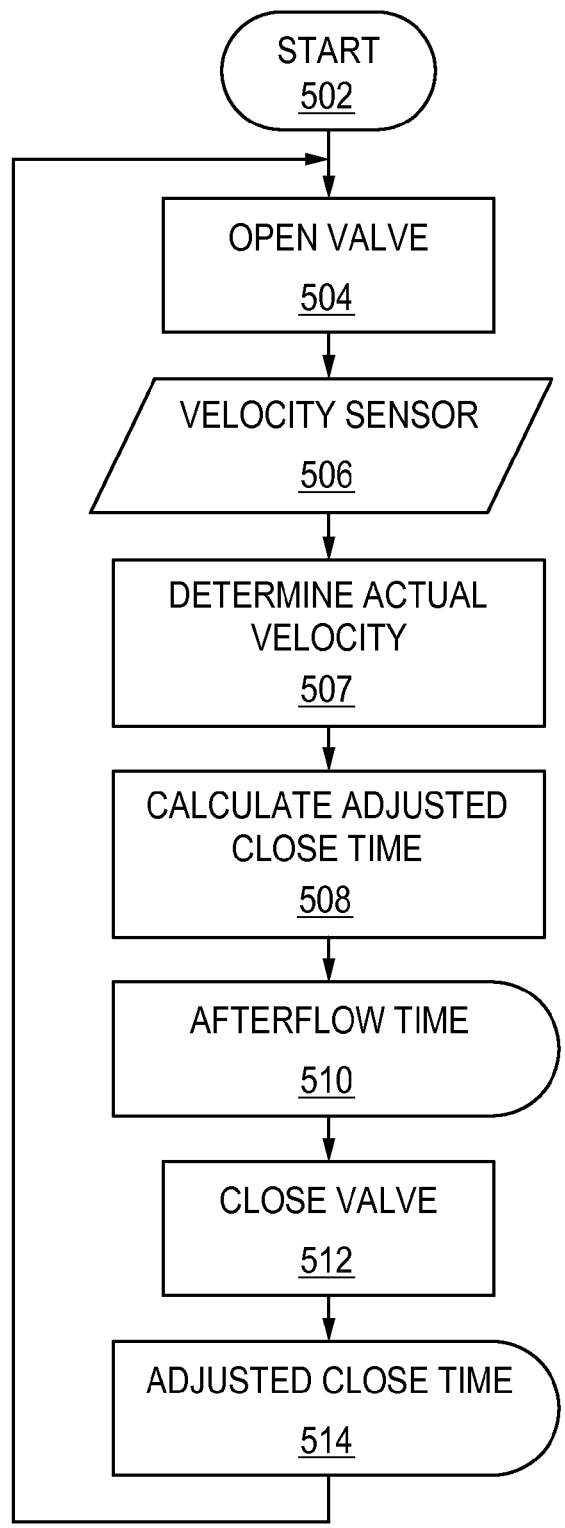
FIG. 11 illustrates a flowchart of a method of controlling the operation of the plunger lift system by altering the close time.

FIG. 11 illustrates a flow chart for optimizing the close time of the plunger lift system 10 when the plunger lift system 10 is used to produce oil or some other saleable fluid from the well 100. Before the plunger lift system 10 is used, a user can set an initial close time, an afterflow time and a target velocity of the plunger 30. The initial close time will be the time the controller 50 allows the control valve 70 to remain closed and fluid to collect above the plunger 30. This initial close time will be based on the conditions of the well 100, but typically will be a relatively short period of time because an operator will want to set a conservative close time that can be altered by the controller 50 while the plunger lift system 10 is in operation.

Similar to the method for optimizing the afterflow time, the target velocity is the ideal velocity of the plunger 30 as it arrives at the top of the well 100. Again, this can be based on a desired "ideal" velocity, such as 250 m/min.

After the initial close time, afterflow time and target velocity have been set in the controller 50, the plunger lift system 10 can be started at step 502 and the method can begin. When the controller 50 opens the control valve 70 at step 504, the plunger 30 can begin to travel up the production tubing 40 to the top of the well 100 and the well head 20 until the plunger 30 reaches the plunger receiver 22. When the plunger 30 reaches the plunger receiver 22, the controller 50 receives a signal from the velocity sensor 80 at step 506 and the velocity of the plunger 30 can be approximated at step 507. At step 507, either the velocity sensor 80 can determine the velocity of the plunger 30 as it passes the velocity sensor 80, or alternatively, the waveforms obtained from the magnetic field sensors can be outputted to the controller 50 and the controller 50 can use the waveforms created by the passing of the plunger 30 to approximate its velocity.

Like the velocity determined for the adjustment of the afterflow time, the velocity of the plunger 30 as it passes the velocity sensor is an indicator of how much fluid is being carried up the well 100 by the plunger 30. If the measured velocity is greater than the target velocity it likely indicates that too much pressure is being allowed to build up and therefore the close time should be decreased. Conversely, if the measured velocity is less than the target rise time, it means not enough pressure has been allowed to build up and the close time can be increased.

With the velocity determined at step 507, the method can move onto step 508 and calculate an adjustment for the initial close time using the actual rise time as follows:

$$\Delta CloseTime = \frac{ActualVelocity - TargetVelocity}{TargetVelocity} \times ScalingFactor \times CloseTime \quad (3)$$

where ΔCloseTime is the change to be made to the close time, TargetVelocity is the target velocity or ideal velocity of the plunger 30 as it passes the velocity sensor 80, ActualVelocity is the velocity of the plunger 30 determined using the velocity sensor 80, ScalingFactor is a range between 0-1 that allows an operator to set how aggressive a change is to be made to close time and the CloseTime is the current close time set in the controller 50 (initially this will be the initial close time). The controller 50 can then apply this change in time to the close time currently being used by the controller 50 to result in an adjusted close time as follows:

$$AdjustedCloseTime = CurrentCloseTime - \Delta CloseTime \quad (4)$$

With the adjusted close time determined at step 508, the controller 50 can move on to step 510 and keep the control valve 70 open for the afterflow time.

At the end of the afterflow time at step 510, the controller 50 can move to step 512 and send a signal to the solenoid 72 to close the control valve 70, shutting the well 100 in, and the plunger 30 can be released from the plunger receiver 22, causing the plunger 30 to drop back down the well 100 to a position proximate the bottom 42 of the well 100.

The controller 50 can leave the control valve 70 closed for the adjusted closed time calculated at step 508, allowing it to collect oil or other fluid above it and the pressure to build up below it. After the close time, the controller 50 can move to step 504 and once again send a signal to open the control valve 70 and wait for a signal from the velocity sensor 80.

The method will keep repeating with the controller 50 repeatedly determining the velocity of the plunger 30 at step 507 as it passes the velocity sensor 80 and then using this newly determined velocity to calculate a change to the close time and an adjusted close time at step 508. The adjusted close time is then used at step 514 as the close time for the plunger lift system 10. In this manner, the close time can be repeatedly adjusted during the operation of the plunger lift system 10 using equations (3) and (4), changing the operation of the system to try and achieve an ideal velocity of the plunger 30 in the well 100 to increase the production of oil or other desirable liquid from the well. Over the course of time, this method will allow the plunger lift system 10 to optimize the close time without any intervention from the operator.

Like the method for adjusting the afterflow time, this method allows the close time to be repeatedly adjusted as the well 100 continues to operate. Because the change made to the close time is a function of the current close time, it also limits the amount that the close time can be adjusted. In this manner, the adjustments are made in a manner to prevent the changes from adversely affecting the well 100.

Additionally, the scaling factor allows an operator to make the adjustments even smaller and more incremental, by allowing the operator to specify a number greater than 0 up to 1, with 1 allowing the greatest adjustment (signifying a change between 0 and 100%). This allows the changes to the close time to be made even more incrementally if desired by the operator.

Figure 12:
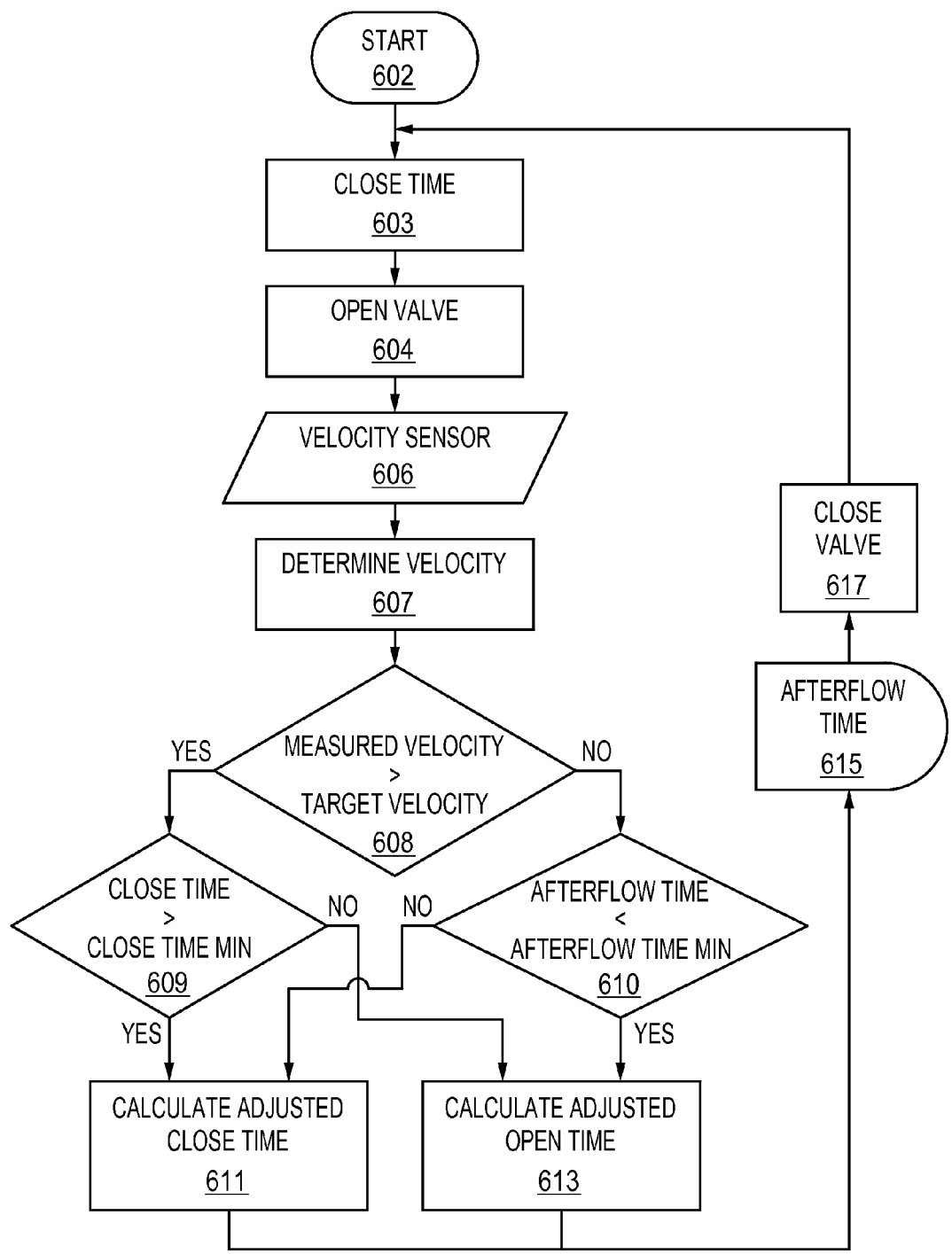
FIG. 12 illustrates a flowchart of a method of controlling the operation of the plunger lifts system by altering the close time and the afterflow time.

FIG. 12 illustrates a flowchart for a method that can adjust both the close time and the afterflow time when the plunger lift system 10 is being used to produce gas from the well 100. The method can adjust both the close time and the afterflow time, attempting to minimize the close time over time. Before the method starts at 602, a user can set an initial close time, an initial afterflow time and a target velocity of the plunger 30. The method will also require the controller 50 to have a limit for the close time in the form of a minimum close time and a limit for the afterflow time in the form of a minimum afterflow time. These minimum close time and minimum afterflow time values can either be preset in the controller 50 or the controller 50 can allow a user to enter these limits.

After the initial afterflow time, initial close time and target velocity have been set in the controller 50, the plunger lift system 10 can be started at step 602 and the method can begin. The controller 50 can first keep the control valve 70 closed for the initial close time at step 603 to let pressure build behind the plunger 30 before opening the control valve 70 at step 604. After step 604, the plunger 30 will begin to travel up the production tubing 40 to the top of the well 100 and the well head 20. The control valve 70 can be left opened at step 604 until the plunger 30 reaches the plunger receiver 22 and the controller 50 receives a signal from the velocity sensor 80 at step 606.

At step 607, the controller 50 can determine the velocity of the plunger 30 as it passed the velocity sensor 80. The velocity sensor 80 itself can either determine the velocity of the plunger 30 and transmit this velocity to the controller 80, or alternatively, the velocity sensor 80 can transmit the waveforms obtained from the passing of the plunger 30 and transmit these waveforms to the controller 50 so that the controller can determine the velocity of the plunger 30.

With the velocity of plunger 30 determined, the controller 50 can move to step 608 where the controller 50 can determine whether the velocity measured by the velocity sensor 80 is faster or slower than the target velocity. If the measured velocity is greater than the target velocity at step 608, the controller 50 can move to step 609 and determine if the current close time is still greater than the minimum close time indicating whether or not the close time can still be adjusted lower. If the close time has not reached the close time minimum limit, the controller 50 can move to step 611 and calculate an adjusted close time using equations (3) and (4). This adjusted close time will be lower than the current close time since the controller 50 has already determined that the measured velocity is higher than the target velocity at step 608.

However, if at step 609 the controller 50 determines that the current close time has reached the minimum close time limit, indicating that the close time has been adjusted as low as it can be, the controller 50 can move on to step 613 and calculate an adjusted afterflow time using equations (1) and (2). This will result in the current afterflow time being increased because the measured velocity is higher than the target velocity.

If back at step 608 the controller 50 determines that the velocity measured by the velocity sensor 80 is lower than the target velocity, then the controller 50 can move onto step 610 and determine whether the current afterflow time is greater than the minimum afterflow time limit stored in the controller 50. If it is, this means that the afterflow time can still be decreased and the controller 50 can then move to step 613 and calculate a lower adjusted afterflow time using equations (1) and (2). Alternatively, if at step 610 the controller 50 determines that the current afterflow time is at the minimum afterflow time limit set in the controller 50, the controller 50 can move to step 611 and calculate an adjusted close time using equations (3) and (4), causing the close time to be increased.

Once the controller 50 has adjusted either the close time or the afterflow time, the controller 50 can move on to step 615 and wait for the current afterflow time before moving onto step 617 and closing the valve 70. After step 617, the controller 50 can move once more to step 603 and wait for the current close time before once again performing steps 604, 606, 607, determining which step to take at 608, 609 and 610 and then adjusting either the close time at step 611 or the afterflow time at step 613 before once again waiting for the afterflow time at step 615 and then closing the valve at step 617.

The method shown in FIG. 12 will adjust the close time when the measured velocity of the plunger 30 is too fast to slow the plunger 30 down until the close time has reached a minimum limit set in the controller 50 and it will adjust the afterflow to slow the plunger 30 down unless the afterflow time reaches a minimum limit. When the close time has reached the minimum limit set in the controller 50, the method will then increase the afterflow time.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A velocity sensor for sensing the velocity of a plunger arriving at a top of a well, the velocity sensor comprising:
   a circuit board;
   a processing unit;
   a first magnetic field sensor positioned on the circuit board;
   a second magnetic field sensor spaced a sensor distance from the first magnetic field sensor on the circuit board;
   at least one memory containing program instructions, the processing unit responsive to the program instructions and operative to:
      obtain measurements of the magnetic field surrounding the first magnetic field sensor from the first magnetic field sensor;
      obtain measurements of the magnetic field surrounding the second magnetic field sensor from the second magnetic field sensor;
      when the plunger passes the first magnetic field sensor and the second magnetic field sensor, determine the pass time for the plunger to pass between the first magnetic field sensor and the second magnetic field sensor; and
      calculate the velocity of the plunger by dividing the sensor distance by the pass time,
   wherein the velocity sensor comprises a single clock and is operative to alternatingly sample the first magnetic field sensor and the second magnetic field sensor.

2. The velocity sensor of claim 1 wherein the pass time is determined by using the time between a threshold value being measured by the first magnetic field sensor and the threshold value being measured by the second magnetic field sensor.

3. The velocity sensor of claim 1 wherein the pass time is determined by using the time between a first peak being measured by the first magnetic field sensor and a first peak being measured by the second magnetic field sensor.

4. The velocity sensor of claim 3 wherein the first peak measured by the first magnetic field sensor and the first peak measured by the second magnetic field sensor is only obtained after the first magnetic field sensor and the second magnetic field sensor measure a threshold value being surpassed.

5. The velocity sensor of claim 1 wherein the sensor distance is less than 20 centimeters.

6. The velocity sensor of claim 1 wherein the sensor distance is less than 15 centimeters.

7. The velocity sensor of claim 1 wherein the sensor distance is less than 10 centimeters.

8. The velocity sensor of claim 1 wherein there is a single circuit board and the processing unit, first magnetic field sensor and the second magnetic field are positioned on the single circuit board.

9. A velocity sensor for sensing the velocity of a plunger arriving at a top of a well, the velocity sensor comprising:
   a circuit board;
   a processing unit;
   a first magnetic field sensor positioned on the circuit board;
   a second magnetic field sensor spaced a sensor distance from the first magnetic field sensor on the circuit board;
   at least one memory containing program instructions, the processing unit responsive to the program instructions and operative to:
      obtain measurements of the magnetic field surrounding the first magnetic field sensor from the first magnetic field sensor;
      obtain measurements of the magnetic field surrounding the second magnetic field sensor from the second magnetic field sensor;
      when the plunger passes the first magnetic field sensor and the second magnetic field sensor, determine the pass time for the plunger to pass between the first magnetic field sensor and the second magnetic field sensor; and calculate the velocity of the plunger by dividing the sensor distance by the pass time, wherein the pass time is determined by using the time between a first peak being measured by the first magnetic field sensor and a first peak being measured by the second magnetic field sensor, and wherein the processing unit is further operative to: calculate a second velocity of the plunger by determining a second pass time by using the time between a second peak being measured by the first magnetic field sensor and a second peak being measured by the second magnetic field and use the pass time, the second pass time and the sensor distance to determine an average velocity of the plunger as it passes the velocity sensor.

10. A velocity sensor for sensing the velocity of a plunger arriving at a top of a well, the velocity sensor comprising:
a circuit board;
a processing unit;
a first magnetic field sensor positioned on the circuit board;
a second magnetic field sensor spaced a sensor distance from the first magnetic field sensor on the circuit board;
at least one memory containing program instructions, the processing unit responsive to the program instructions and operative to:
obtain measurements of the magnetic field surrounding the first magnetic field sensor from the first magnetic field sensor;
obtain measurements of the magnetic field surrounding the second magnetic field sensor from the second magnetic field sensor;
when the plunger passes the first magnetic field sensor and the second magnetic field sensor, determine the pass time for the plunger to pass between the first magnetic field sensor and the second magnetic field sensor; and
calculate the velocity of the plunger by dividing the sensor distance by the pass time,
wherein the pass time is determined by: determining a first baseline value for the first magnetic field sensor indicating a background magnetic field strength surrounding the first magnetic field sensor and a second baseline value for the second magnetic field sensor indicating a background magnetic field strength surrounding the second magnetic field sensor; and using a time between the first magnetic field sensor measuring a first re-crossing of the first baseline and a time the second magnetic field sensor measures a first re-crossing of the second baseline for the pass time.

11. The velocity sensor of claim 10 wherein the first re-crossing of the first baseline value measured by the first magnetic field sensor and the first re-crossing of the second baseline value measured by the second magnetic field sensor is only obtained after at least one of the first magnetic field sensor and the second magnetic field sensor measure a threshold value being surpassed.

12. The velocity sensor of claim 10 wherein the processing unit is further operative to: determine a second pass time by using a time between the first magnetic field sensor measuring a second re-crossing of the first baseline and a time the second magnetic field sensor measures a second re-crossing of the second baseline for a second pass time; and use the pass time, second pass time and sensor distance to calculate an average velocity of the plunger as it passes the velocity sensor.

13. A method for determining a velocity of a plunger in a plunger lift system, the method comprising:

providing a velocity sensor having a first magnetic field sensor and a second magnetic field sensor spaced a sensor distance apart;
determining a pass time for the plunger to pass between the first magnetic field sensor and the second magnetic field sensor wherein the pass time is determined by using the time between a first peak being measured by the first magnetic field sensor and a first peak being measured by the second magnetic field sensor;
using the sensor distance and the pass time to calculate a first velocity of the plunger as it passes the first magnetic field sensor and the second magnetic field sensor,
calculating a second velocity of the plunger by determining a second pass time by using the time between a second peak being measured by the first magnetic field sensor and a second peak being measured by the second magnetic field; and
using the pass time, the second pass time and the sensor distance to determine an average velocity of the plunger as it passes the velocity sensor.

14. The method of claim 13 wherein the first peak measured by the first magnetic field sensor and the first peak measured by the second magnetic field sensor is only obtained after the first magnetic field sensor and the second magnetic field sensor measure a threshold value being surpassed.

15. The method of claim 13 wherein the sensor distance is less than 20 centimeters.

16. The method of claim 13 wherein the sensor distance is less than 15 centimeters.

17. The method of claim 13 wherein the sensor distance is less than 10 centimeters.

18. The method of claim 13 wherein the velocity sensor has a circuit board and the first magnetic field sensor and the second magnetic field are positioned on the circuit board.

19. A method for determining a velocity of a plunger in a plunger lift system, the method comprising:
providing a velocity sensor having a first magnetic field sensor and a second magnetic field sensor spaced a sensor distance apart;
determining a pass time for the plunger to pass between the first magnetic field sensor and the second magnetic field sensor; and
using the sensor distance and the pass time to calculate the velocity of the plunger as it passes the first magnetic field sensor and the second magnetic field sensor,
wherein the pass time is determined by: determining a first baseline value for the first magnetic field sensor indicating a background magnetic field strength surrounding the first magnetic field sensor and a second baseline value for the second magnetic field sensor indicating a background magnetic field strength surrounding the second magnetic field sensor; and using a time between the first magnetic field sensor measuring a first re-crossing of the first baseline and a time the second magnetic field sensor measures a first re-crossing of the second baseline for the pass time.

20. The method of claim 19 wherein the first re-crossing of the first baseline value measured by the first magnetic field sensor and the first re-crossing of the second baseline value measured by the second magnetic field sensor is only obtained after at least one of the first magnetic field sensor and the second magnetic field sensor measure a threshold value being surpassed.

21. The method of claim 19 further comprising: determining a second pass time by using a time between the first magnetic field sensor measuring a second re-crossing of the first baseline and a time the second magnetic field sensor measures a second re-crossing of the second baseline for a second pass time; and using the pass time, second pass time and sensor distance to calculate an average velocity of the plunger as it passes the velocity sensor.

22. The method of claim 19 wherein the velocity sensor has a circuit board and the first magnetic field sensor and the second magnetic field are positioned on the circuit board.

23. A controller for controlling the operation of a plunger lift system for a gas producing well having a plunger, a plunger velocity sensor and a valve between the well and an outlet line, the controller comprising:
at least one processing unit;
an input interface operatively connectable to the plunger velocity sensor;
an output interface operatively connectable to the valve and operative to open and close the valve;
at least one memory containing program instructions, the at least one processing unit responsive to the program instructions and operative to:
open the valve and allowing the plunger to rise to a top of the well;
in response to receiving a signal from the plunger velocity sensor, close the valve and determine a measured velocity of the plunger proximate a top of the well;
using a current afterflow time and a difference between a target plunger velocity and the measured velocity to calculate an adjusted afterflow time;
after the adjusted afterflow time has passed, close the valve and keeping the valve closed for a close time; and
repeat the steps of the method, each time calculating a new adjusted afterflow time and keeping the control valve open for the new adjusted afterflow time.

24. The controller of claim 23 wherein the signal received from the velocity sensor includes a velocity of the plunger measured and calculated by the velocity sensor.

25. The controller of claim 23 wherein the signal received from the velocity sensor includes magnetic field sensor readings from the velocity sensor and the controller calculates a measured velocity of the plunger using the magnetic field sensor readings.

26. A method of operating a plunger lift system in a gas producing well, the method comprising:
opening a control valve and allowing a plunger to rise to a top of the well;
measuring a velocity of the plunger using a velocity sensor positioned proximate the top of the well;
using a current afterflow time and a difference between a target velocity and the actual velocity to calculate an adjusted afterflow time;
allowing the adjusted afterflow time to pass before closing the control valve and keeping the valve closed for a close time; and
repeating the steps of the method, each time calculating a new adjusted afterflow time and keeping the control valve open for the new adjusted afterflow time.

27. The method of claim 26 wherein the velocity sensor has a circuit board, a first magnetic field sensor positioned on the circuit board and a second magnetic field positioned on the circuit board.

28. A method of operating a plunger lift system in a gas producing well, the method comprising:
opening a control valve and allowing a plunger to rise to a top of the well;
measuring a plunger velocity indicating a velocity of the plunger using a velocity sensor positioned proximate the top of the well;
allowing an afterflow time to pass before closing the control valve and keeping the valve closed for a close time;
repeating the steps of the method; and
if a measured plunger velocity exceeds a threshold velocity, shutting down the well.

29. The method of claim 28 wherein if a measured plunger velocity is greater than a second threshold velocity, shutting down the well and wherein if a predetermined number of plunger velocities are measured above a first threshold velocity and below the second threshold velocity, shutting down the well.

30. The method of claim 28 wherein the velocity sensor has a circuit board, a first magnetic field sensor positioned on the circuit board and a second magnetic field positioned on the circuit board.

31. A plunger lift system for removing fluids from a well, the system comprising:
a wellhead provided at a top of the well and having a plunger receiver;
production tubing connected to the well head and extending downwards down the well, the plunger receiver operatively connected to a top end of the production tubing;
a plunger provided in the production tubing;
an outlet line connected to the well head below the plunger receiver and fluidly connected with the production tubing;
a control valve connected inline with the outlet line;
a velocity sensor positioned on the outside of the plunger receiver to measure the velocity of the plunger as the plunger enters the plunger receiver; and
a controller operatively connected to the velocity sensor to receive velocity data from the velocity sensor and operatively connected to the control valve to open and close the control valve.

32. The system of claim 31 wherein the velocity plunger comprises:
a circuit board;
a processing unit;
a first magnetic field sensor positioned on the circuit board;
a second magnetic field sensor spaced a sensor distance from the first magnetic field sensor on the circuit board;
at least one memory containing program instructions, the processing unit responsive to the program instructions and operative to:
obtain measurements of the magnetic field surrounding the first magnetic field sensor from the first magnetic field sensor;
obtain measurements of the magnetic field surrounding the second magnetic field from the second magnetic field;
when the plunger passes the first magnetic field sensor and the second magnetic field sensor, determine the pass time for the plunger to pass between the first magnetic field sensor and the second magnetic field sensor; and
calculate the velocity of the plunger by dividing the sensor distance by the pass time.

33. The system of claim 32 wherein the plunger velocity sensor is positioned on the outside of the plunger receiver so that the first magnetic field sensor and second magnetic field sensor are positioned in a line parallel to a path of the plunger.

* * * * *

UNITED STATES PATENT AND TRADEMARK OFFICE
CERTIFICATE OF CORRECTION

| | | |
|---|---|---|
| PATENT NO. | : 9,587,479 B2 | Page 1 of 1 |
| APPLICATION NO. | : 14/181218 | |
| DATED | : March 7, 2017 | |
| INVENTOR(S) | : Scantlebury et al. | |

It is certified that error appears in the above-identified patent and that said Letters Patent is hereby corrected as shown below:

On the Title Page

After item (65) and before item (51), the following information should be listed:

(30) Foreign Application Priority Data
Feb. 15, 2013 (CA) ....................... 2806186

Signed and Sealed this
Sixteenth Day of May, 2017

Michelle K. Lee
*Director of the United States Patent and Trademark Office*